(12) United States Patent (10) Patent No.: US 12,689,891 B2
Je et al. (45) Date of Patent: Jul. 21, 2026

(54) METHOD, APPARATUS, AND SYSTEM FOR USER PLANE SECURITY IN COMMUNICATION SYSTEM

(71) Applicant: Samsung Electronics Co., Ltd., Suwon-si (KR)

(72) Inventors: Donghyun Je, Suwon-si (KR); Jungsoo Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 448 days.

(21) Appl. No.: 17/934,142

(22) Filed: Sep. 21, 2022

(65) Prior Publication Data

US 2023/0107731 A1 Apr. 6, 2023

(30) Foreign Application Priority Data

Oct. 1, 2021 (KR) ........................ 10-2021-0131165

(51) Int. Cl.
| | |
|---|---|
| *H04L 9/32* | (2006.01) |
| *H04L 9/40* | (2022.01) |
| *H04W 12/02* | (2009.01) |
| *H04W 12/033* | (2021.01) |
| *H04W 12/106* | (2021.01) |

(52) U.S. Cl.
CPC ......... *H04W 12/033* (2021.01); *H04L 63/123* (2013.01); *H04W 12/106* (2021.01)

(58) Field of Classification Search
CPC .............. H04W 12/033; H04W 12/106; H04L 63/123; H04L 63/0428; H04L 9/3242; H04L 63/166
See application file for complete search history.

(56) References Cited

U.S. PATENT DOCUMENTS

| | | | |
|---|---|---|---|
| 2010/0034207 A1 | 2/2010 | Mcgrew et al. | |
| 2014/0294179 A1 | 10/2014 | Sammour et al. | |

(Continued)

FOREIGN PATENT DOCUMENTS

| | | | | |
|---|---|---|---|---|
| EP | 4016949 A1 | * | 6/2022 | ............ H04W 76/12 |
| GB | 2637518 A | * | 7/2025 | .......... H04W 12/106 |

(Continued)

OTHER PUBLICATIONS

"3rd Generation Partnership Project; Technical Specification Group Services and System Aspects; Security architecture and procedures for 5G system (Release 17)", 3GPP TS 33.501 V17.3.0 (Sep. 2021), pp. 1-258 (Year: 2021).*

(Continued)

*Primary Examiner* — Fatoumata Traore
*Assistant Examiner* — Courtney D Fields

(57) ABSTRACT

Disclosed is a 6G communication system for achieving a high data transmission rate and a super-low latency time after 4G and 5G communication systems. According to various embodiments of the present disclosure, a method of selectively performing integrity protection or ciphering for data (for example, UP data, user data, or application data), an apparatus for performing the method, and a system for implementing embodiments are provided. According to an embodiment, a UP security procedure based on whether data is ciphered is provided. According to an embodiment, when confidentiality and integrity are provided for data, a packet structure for improving calculation efficiency is provided. Accordingly, an effect of reducing calculation resources and calculation time spent for enhancing security of data can be obtained by preventing already ciphered data from being overlappingly ciphered, and thus a more efficient communication system can be implemented.

14 Claims, 27 Drawing Sheets

(56)                References Cited

U.S. PATENT DOCUMENTS

| | | |
|---|---|---|
| 2018/0146467 A1 | 5/2018 | Kim et al. |
| 2019/0020688 A1 | 1/2019 | Miao et al. |
| 2019/0223015 A1 | 7/2019 | Lee et al. |
| 2020/0186507 A1 | 6/2020 | Dhanabalan et al. |
| 2021/0014339 A1 | 1/2021 | Zhang et al. |

FOREIGN PATENT DOCUMENTS

| | | | | |
|---|---|---|---|---|
| WO | WO-2020260921 A2 * | 12/2020 | ............. | H04L 63/12 |
| WO | WO-2021031055 A1 * | 2/2021 | ............ | H04W 76/12 |
| WO | 2021186215 A1 | 9/2021 | | |
| WO | WO-2022120744 A1 * | 6/2022 | ............ | H04W 76/19 |

OTHER PUBLICATIONS

Lou et al., "Data Transmission Processing Method and Related Apparatus"; English Translation of WO 2022120744 A1; Year 2022; 30 pages (Year: 2022).*

Lisa Wernet; Sebastian Rust; Silas Gerock; Tobias Meuser, Bjorn Scheuermann; "QUICUP: Secure User Plane Tunneling for Cellular Networks"; 2025 IEEE 50th Conference on Local Computer Networks (LCN); Year: Jun. 2025, Conference Paper; IEEE; pp. 1-9 (Year: 2025).*

"3rd Generation Partnership Project; Technical Specification Group Services and System Aspects; Security architecture and procedures for 5G system (Release 17)", 3GPP TS 33.501 V17.3.0 (Sep. 2021), 258 pages.

International Search Report and Written Opinion of the International Searching Authority in connection with International Patent Application No. PCT/KR2022/013686 dated Dec. 9, 2022, 10 pages.

Supplementary European Search Report dated Nov. 19, 2024, in connection with European Patent Application No. 22876712.5, 8 pages.

Office Action dated Jan. 12, 2026, in connection with Korean Application No. 10-2021-0131165, 8 pages.

Communication pursuant to Article 94(3) EPC dated Apr. 10, 2026, in connection with European Application No. 22876712.5, 7 pages.

Examination Report dated May 4, 2026, in connection with Indian Application No. 202417019094, 9 pages.

* cited by examiner

FIG. 8

| PDCP-H | SDAP-H | PDU-H | Data |
|--------|--------|-------|------|

-H : Header

METHOD, APPARATUS, AND SYSTEM FOR USER PLANE SECURITY IN COMMUNICATION SYSTEM

CROSS-REFERENCE TO RELATED APPLICATION

This application is based on and claims priority under 35 U.S.C. § 119 to Korean Patent Application No. 10-2021-0131165, filed on Oct. 1, 2021, in the Korean Intellectual Property Office, the disclosure of which is herein incorporated by reference in its entirety.

BACKGROUND

1. Field

The disclosure relates to user plane (UP) security in a communication system. More particularly, the disclosure relates to UP security for providing confidentiality and integrity of UP data in a communication system.

2. Description of Related Art

A review of the development of mobile communication from generation to generation shows that the development has mostly been directed to technologies for services targeting humans, such as voice-based services, multimedia services, and data services. It is expected that connected devices which are exponentially increasing after commercialization of 5G communication systems will be connected to communication networks. Examples of things connected to networks may include vehicles, robots, drones, home appliances, displays, smart sensors connected to various infrastructures, construction machines, and factory equipment. Mobile devices are expected to evolve in various formfactors, such as augmented reality glasses, virtual reality headsets, and hologram devices. In order to provide various services by connecting hundreds of billions of devices and things in the 6G era, there have been ongoing efforts to develop improved 6G communication systems. For these reasons, 6G communication systems are referred to as "beyond-5G" systems.

6G communication systems, which are expected to be implemented approximately by 2030, will have a maximum transmission rate of tera (1,000 giga)-level bps and a radio latency of 100 μsec, and thus will be 50 times as fast as 5G communication systems and have the ¹/₁₀ radio latency thereof.

In order to accomplish such a high data transmission rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, a technology capable of securing the signal transmission distance (that is, coverage) will become more crucial. It is necessary to develop, as major technologies for securing the coverage, multiantenna transmission technologies including radio frequency (RF) elements, antennas, novel waveforms having a better coverage than OFDM, beamforming and massive MIMO, full dimensional MIMO (FD-MIMO), array antennas, and large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the frequency efficiencies and system networks, the following technologies have been developed for 6G communication systems: a full-duplex technology for enabling an uplink (UE transmission) and a downlink (node B transmission) to simultaneously use the same frequency resource at the same time; a network technology for utilizing satellites, high-altitude platform stations (HAPS), and the like in an integrated manner; a network structure innovation technology for supporting mobile nodes B and the like and enabling network operation optimization and automation and the like; a dynamic spectrum sharing technology though collision avoidance based on spectrum use prediction, an artificial intelligence (AI)-based communication technology for implementing system optimization by using AI from the technology design step and internalizing end-to-end AI support functions; and a next-generation distributed computing technology for implementing a service having a complexity that exceeds the limit of UE computing ability by using super-high-performance communication and computing resources (mobile edge computing (MEC), clouds, and the like). In addition, attempts have been continuously made to further enhance connectivity between devices, further optimize networks, promote software implementation of network entities, and increase the openness of wireless communication through design of new protocols to be used in 6G communication systems, development of mechanisms for implementation of hardware-based security environments and secure use of data, and development of technologies for privacy maintenance methods.

It is expected that such research and development of 6G communication systems will enable the next hyper-connected experience in new dimensions through the hyper-connectivity of 6G communication systems that covers both connections between things and connections between humans and things. Particularly, it is expected that services such as truly immersive XR, high-fidelity mobile holograms, and digital replicas could be provided through 6G communication systems. In addition, with enhanced security and reliability, services such as remote surgery, industrial automation, and emergency response will be provided through 6G communication systems, and thus these services will be applied to various fields including industrial, medical, automobile, and home appliance fields.

In the above-described communication system, a data transmission method having high reliability should be supported and it is required to strengthen security in order to deal with data transmission errors and attacks from unidentified and unspecified users. Accordingly, various methods of enhancing security of data on various services (for example, user data, UP data, or application data) are being discussed.

The above information is presented as background information only to assist with an understanding of the disclosure. No determination has been made, and no assertion is made, as to whether any of the above may be applicable as prior art with regard to the disclosure.

SUMMARY

As a method of enhancing data security, ciphering of providing confidentiality protection and integrity protection of providing integrity of data may be considered. Meanwhile, although data has been already ciphered, integrity-protected, or ciphered and integrity-protected in a communication system, the data may be overlappingly ciphered. In order to implement an efficient communication system, it is required to invent a method of selectively performing ciphering or integrity protection on data according to whether the data is ciphered in that ciphering or integrity protection are procedures that have high calculation complexity and need much calculation time.

In order to solve the problem, according to an embodiment, a method of a network entity is provided. The security method includes identifying whether data included in a packet is ciphered, and when the data is ciphered, transmitting a signal indicating provision of security for information related to the data included in the packet.

According to an embodiment, a method of a UE is provided. The method of the UE includes identifying whether data included in a packet is ciphered, when the data is ciphered, transmitting a signal making a request for providing security for information related to the data included in the packet, and receiving a signal indicating provision of the security for the information related to the data in response to the signal.

According to an embodiment, a method of a server is provided. The method of the server includes identifying whether data included in a packet is ciphered, and when the data is ciphered, transmitting a signal making a request for providing security for information related to data included in the packet.

According to an embodiment, a network entity is provided. The network entity includes a transceiver and a controller connected to the transceiver and configured to identify whether data included in the packet is ciphered and, when the data is ciphered, transmit a signal indicating provision of information related to the data included in the packet through the transceiver.

According to an embodiment, a UE is provided. The UE includes a transceiver, and a controller connected to the transceiver and configured to identify whether data included in a packet is ciphered, transmit a signal making a request for providing security for information related to the data included in the packet through the transceiver when the data is ciphered, and receive a signal indicating provision of the security for the information related to the data through the transceiver in response to the signal.

According to an embodiment, a server is provided. The server includes a transceiver, and a controller connected to the transceiver and configured to identify whether data included in a packet is ciphered and transmit a signal making a request for providing security for information related to the data included in the packet through the transceiver when the data is ciphered.

According to various embodiments, a method of selectively performing integrity protection or ciphering for data (for example, UP data, user data, or application data), an apparatus for performing the method, and a system for implementing embodiments are provided.

According to an embodiment, a UP security procedure based on whether data is ciphered is provided. According to an embodiment, when confidentiality and integrity are provided for data, a packet structure for improving calculation efficiency is provided.

Accordingly, an effect of reducing calculation resources and calculation time spent for enhancing security of data can be obtained by preventing already ciphered data from being overlappingly ciphered, and thus a more efficient communication system can be implemented.

Advantageous effects obtainable from the disclosure may not be limited to the above mentioned effects, and other effects which are not mentioned may be clearly understood, through the following descriptions, by those skilled in the art to which the disclosure pertains.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments will be more apparent from the following description taken in conjunction with the accompanying drawings, in which:

FIG. 8 illustrates an example of a packet structure in a layer performing data ciphering and integrity protection in a communication system according to various embodiments of the present disclosure;

FIG. 9A illustrates an example of a protocol structure in which data can be transmitted and received in a communication system according to various embodiments of the present disclosure;

FIG. 16 illustrates operations of a transmitter and a receiver in a UP security procedure based on whether data is ciphered according to various embodiments of the present disclosure;

DETAILED DESCRIPTION

Figure 1:
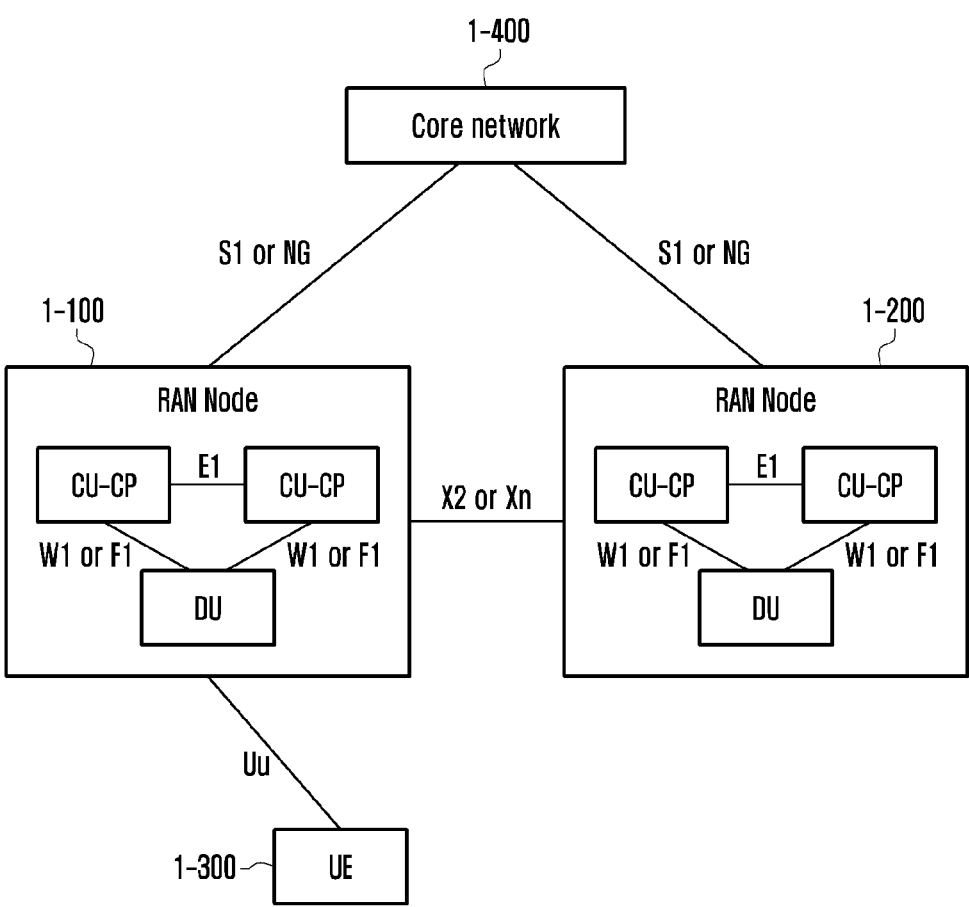
FIG. 1 illustrates a communication system according to various embodiments of the present disclosure.

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments will be described in detail with reference to the accompanying drawings.

In describing the embodiments, descriptions related to technical contents well-known in the art and not associated directly with the disclosure will be omitted.

Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings.

However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit," or divided into a larger number of elements, or a "unit." Moreover, the elements and "units" or may be implemented to reproduce one or more CPUs within a device or a security multimedia card.

In the following description, some of terms and names defined in the 3rd generation partnership project (3GPP) standards (standards for 5G, NR, LTE, or similar systems) may be used for the convenience of description. In addition, terms and names used in existing communication systems or newly defined in next-generation communication systems (e.g., 6G and beyond-5G systems) to which the disclosure is applicable may also be used. Use of these terms is not intended to limit the disclosure by the terms and names, and the disclosure may be applied in the same way to systems that conform other standards. Embodiments may be easily applied to other communication systems through modifications.

As used in an embodiment, it will be understood that the singular expressions "a," "an," and "the" includes plural expressions unless the context clearly indicates otherwise.

As used in an embodiment, the terms including an ordinal number, such as "a first" and "a second" may be used to describe various elements, but the corresponding elements should not be limited by such terms. These terms are used merely to distinguish between one element and any other element. For example, a first element may be termed a second element, and similarly, a second element may be termed a first element without departing from the scope of the disclosure.

As used in an embodiment, the term "and/or" includes any one or combinations of a plurality of relevant items enumerated.

The terms as used in an embodiment are merely used to describe specific embodiments, and are not intended to limit the disclosure. A singular expression may include a plural expression unless they are definitely different in a context. As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

As used in an embodiment, the phrases "associated with" and "associated therewith", as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

As used in the disclosure, the expression "greater than" or "less than" is used to determine whether a specific condition is satisfied or fulfilled, but this is intended only to illustrate an example and does not exclude "greater than or equal to" or "equal to or less than." A condition indicated by the expression "greater than or equal to" may be replaced with a condition indicated by "greater than", a condition indicated by the expression "equal to or less than" may be replaced with a condition indicated by "less than," and a condition indicated by "greater than and equal to or less than" may be replaced with a condition indicated by "greater than and less than."

In the disclosure, embodiments will be described using terms employed in some communication standards (e.g., long term evolution (LTE) and new radio (NR) defined by the 3rd generation partnership project (3GPP)), but they are only for the sake of illustration. The embodiments may also be easily applied to other communication systems through modifications.

Before the detailed description of the disclosure, examples of construable meanings of some terms used herein are given below. However, it should be noted that the terms are not limited to the examples of the construable meanings as given below.

In the disclosure, a terminal (or communication terminal) is an entity that communicates with a base station or any other terminal, and may be referred to as a node, a user equipment (UE), a next generation UE (NG UE), a mobile station (MS), a device, a terminal, or the like. The terminal may include at least one of a smartphone, a tablet personal computer (PC), a mobile phone, a video phone, an electronic book reader, a desktop PC, a laptop PC, a netbook computer, a personal digital assistant (PDA), a portable multimedia player (PMP), an MP3 player, a medical device, a camera, and a wearable device. Also, the terminal may include at least one of a television, a digital video disk (DVD) player, an audio, a refrigerator, an air conditioner, a vacuum cleaner, an oven, a microwave oven, a washing machine, an air purifier, a set-top box, a home automation control panel, a security control panel, a media box, a game console, an electronic dictionary, an electronic key, a camcorder, and an electronic photo frame. In addition, the terminal may include at least one of various medical devices (e.g., various portable medical measuring devices (blood glucose monitoring device, heart rate monitoring device, blood pressure measuring device, body temperature measuring device, etc.), magnetic resonance angiography (MRA), magnetic resonance imaging (MRI), computed tomography (CT) machine, ultrasonic machine, etc.), a navigation device, a global positioning system (GPS) receiver, an event data recorder (EDR), a flight data recorder (FDR), a vehicle infotainment device, electronic equipment for a ship (e.g., ship navigation device, gyro-compass, etc.), avionics, a security device, an automobile head unit, a home or industrial robot, a drone, an automatic teller's machine (ATM) in banks, point of sales (POS) in a shop, or Internet of things devices (e.g., light bulb, various sensors, electric or gas meter, sprinkler device, fire alarm, thermostat, streetlamp, toaster, sporting goods, hot water tank, heater, boiler, etc.). However, the disclosure is not limited by the above examples, and the terminal may also be referred to by terms having the same or similar meanings.

In the disclosure, a base station is an entity that communicates with terminals and allocates resources to the terminals, and may be referred to as a base station (BS), a Node B (NB), a next generation radio access network (NG RAN), an access point (AP), a transmission reception point (TRP), a wireless access unit, a base station controller, a node on a network, or the like. Alternatively, according to function split, the base station may be referred to as a central unit (CU) or a distributed unit (DU). However, the disclosure is not limited by the above examples, and the base station may also be referred to by terms having the same or similar meanings.

In the disclosure, a radio resource control (RRC) message may be referred to as high-level information, a high-level message, a high-level signal, high-level signaling, high-layer signaling, or higher-layer signaling, but the disclosure is not limited thereto and the RRC message may be referred to as the term having the same or similar meaning.

Further, in the disclosure, data may be referred to as user data, user plane (UP) data, or application data, or may be referred to as the term having a meaning that is the same as or similar to a signal transmitted and received through a data radio bearer (DRB).

In addition, in the disclosure, a direction of data transmitted from a user equipment (UE) may be referred to as an uplink, and a direction of data transmitted to the UE may be referred to as a downlink. Accordingly, in the case of uplink transmission, a transmitter may be the UE, and a receiver may be a base station (BS) or a specific network entity in a communication system. Alternatively, in the case of downlink transmission, the transmitter may be a BS or a specific network entity in the communication system, and the receiver may be a UE.

In the disclosure, integrity protection may include integrity protection in a transmitting side and integrity verification in a receiving side. Accordingly, performing integrity protection for data in the disclosure may have the same meaning as providing integrity for data, which may mean that the transmitting side performs integrity protection and the receiving side performs integrity verification for data.

In the disclosure, ciphering may include ciphering in a transmitting side and deciphering in the receiving side. Accordingly, performing ciphering for data in the disclosure may have the same meaning as providing confidentiality for data, which may mean that the transmitting side performs ciphering and the receiving side performs deciphering for data.

In the disclosure, providing security for data in the disclosure may have the same meaning as applying security to data, which may mean that a series of procedures for enhancing security of data are performed. For example, it may mean performing ciphering for providing confidentiality to data or performing integrity protection for providing integrity to the data.

Meanwhile, although the following description is made on the basis of a UP security procedure for providing security to data (user data or application data) transmitted and received in a DRB of the UP, the disclosure is not limited thereto. It is apparent to those skilled in the art that the disclosure can be applied to various security procedures.

FIG. 1 illustrates a communication system according to various embodiments of the present disclosure.

Referring to FIG. 1, illustrated radio access network (RAN) nodes 1-100 and 1-200 may be LTE evolved node Bs (eNodeBs) connected to a mobile communication core network (CN) such as an evolved packet core (EPC) or a 5G core network (5GC), next generation node Bs (NR gNBs), base stations in a next-generation mobile communication system, or network nodes performing the same or similar functions. Meanwhile, the RAN nodes 1-100 and 1-200 may have functions divided into a centralized unit (CU) and a distributed unit (DU), and the CU may be have functions divided into a CU-control plane (CP) and a CU-user plane (UP).

In the disclosure, one RAN node may include one or more CU-CUPs, one or more CU-UPs, and one or more DUs. Further, one RAN node may include a CU-CP, a CU-UP, and a DU. For example, one RAN node may include a CU in which a CU-CP and a CU-UP are implemented together and a DU. Alternatively, one RAN node may be configured in the form of an integrated base station in which a CU-CP, a CU-UP, and a DU are implemented together. Meanwhile, the configuration of the RAN corresponds to only an example, and the disclosure is not limited thereto. One RAN may be configured by another combination other than the examples.

In the disclosure, a CU and a DU may support divided functions of the BS, respectively. For example, the CU may support functions of a radio resource control (RRC) layer or a packet data convergence protocol (PDCP) layer, and the DU may support functions of a radio link control (RLC) layer, a medium access control (MAC) layer, a physical (PHY) layer, or a radio frequency (RF) layer. Further, the CU and the DU may be connected to each other through an interface between internal BS functions such as a W1 interface or an F1 interface. Meanwhile, a detailed description of the functions of respective layers supported by the CU and the DU is made below with reference to FIG. 2.

In the disclosure, the CU may be divided into a CU-CP and a CU-UP. In this case, for example, the CU-CP may support functions of the RRC layer or the PDCP (for RRC) layer, and the CU-UP may support functions of a PDCH (for user data transmission) layer. The CU-CP and the CU-UP may be connected through an interface between internal base station functions such as an E1 interface.

In the disclosure, the RAN node or the BS may be implemented in an integrated structure or a distributed structure, and the connection between integrated BSs, distributed BSs, and the integrated BS and the distributed BS may be possible. RAN nodes may be connected through an interface between BSs such as an X2 interface or an Xn interface. Further, the RAN node and the core network may be connected through an interface a BS and a core network such as an Si interface or an NG interface.

In the disclosure, the core network may include various entities (for example, network entities performing other specific function such as user plane function (UPF), session management function (SMF), access and mobility function (AMF), network exposure function (NEF), or application function (AF)).

The UPF is a network function (NF) serving as a user plane. The UPF may perform a function of mapping a packet of internet protocol (IP) flow to specific QoS flow belonging to a specific protocol data unit (PDU) session on the basis of information (for example, at least one of a packet detection rule (PDF), a forwarding action rule (FAR), a quality of service enforcement rule (QER), or a usage reporting rule (URR)) received from one (for example, SMF) of the control plane NFs.

The SNF is one of the network functions (NFs) serving as a control plane in the core network. The SMF may transmit information (for example, at least one of a QoS flow indicator (QFI), a QoS profile, a PDR, an FAR, a QER, or a URR) required for guaranteeing quality of service (QoS) to the UPF and the BS. Further, the SMF may determine a UP security policy indicating whether to activate UP confidentiality or UP integrity for all DRBs belonging to the corresponding PDU session in a PDU session establishment procedure and transfer the same to the BS through the AMF.

Meanwhile, the communication system has been described as only an example of communication systems to which the disclosure can be applied, but the disclosure is not limited thereto. That is, embodiments provided in the disclosure may be applied to and implemented in various communication systems.

Figure 2:
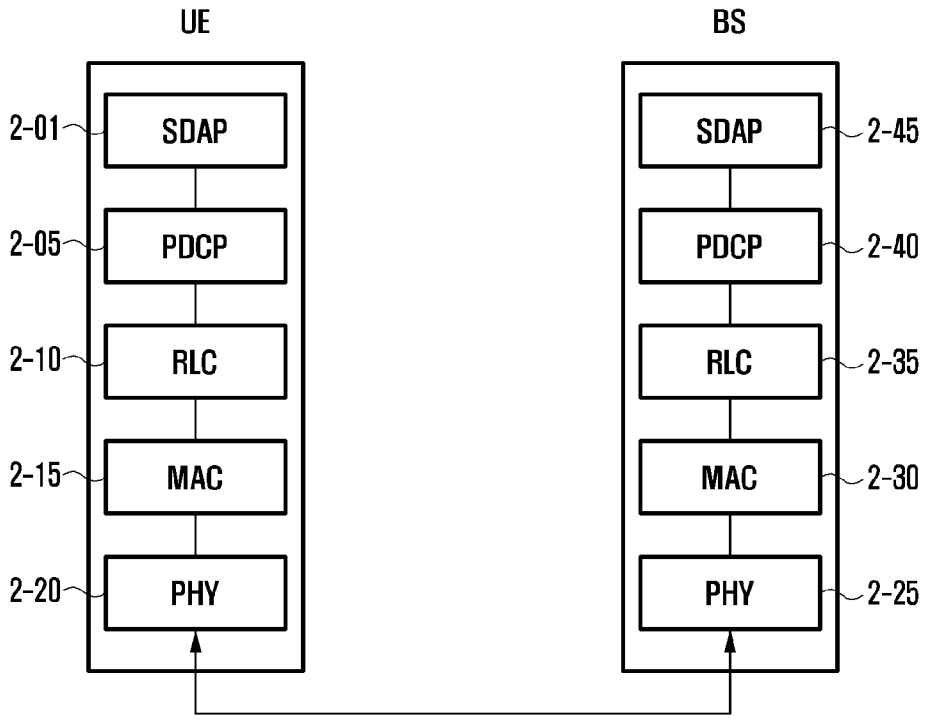
FIG. 2 illustrates a protocol structure of a communication system according to various embodiments of the present disclosure.

FIG. 2 illustrates a protocol structure of a communication system according to various embodiments of the present disclosure.

Referring to FIG. 2, the protocol structure of the communication system may include service data adaptation protocols (SDAPs) 2-01 and 2-45, PDCPs 2-05 and 2-40, RLCs 2-10 and 2-35, MACs 2-15 and 2-30, and PHYs 2-20 and 2-25 in the UE and the BS.

Main functions of the SDAPs 2-01 and 2-45 may include some of the following functions;

User data transmission function (transfer of user-plane data);

Function of mapping QoS flow and a data bearer for uplink and downlink (mapping between a QoS flow and a DRB for both DL and UL);

Function of marking a QoS flow ID for uplink and downlink (marking QoS flow ID in both DL and UL packets); and Function of mapping reflective QoS flow to a data bearer for uplink SDAP PDUs (reflective QoS flow to DRB mapping for the UL SDAP PDUs).

For the SDAP layer (or an SDAP layer device), the UE may receive a configuration indicating whether to use the header of the SDAP layer device or the function of the SDAP layer device for each PDCP layer device, each bearer, or each logical channel through a radio resource control (RRC) message. When the SDAP header is configured, the UE may indicate an update or a reconfiguration of mapping information for uplink and downlink QoS flow and the data bearer through a non-access stratum (NAS) quality of service (QoS) reflective configuration 1-bit indicator (NAS reflective QoS) and an access stratum (AS) QoS reflective configuration 1-bit indicator (AS reflective QoS) of the SDAP header. The SDAP header may include QoS flow ID information indicating the QoS. QoS information may be used for data processing priority, scheduling information, or the like to support a smooth service.

Main functions of the PDCPs 2-05 and 2-40 may include some of the following functions:

Header compression and decompression function (Header compression and decompression: ROHC only);

User data transmission function (transfer of user data);

Sequential delivery function (in-sequence delivery of upper-layer PDUs);

Non-sequential delivery function (out-of-sequence delivery of upper-layer PDUs);

Reordering function (PDCP PDU reordering for reception);

Duplicate detection function (duplicate detection of lower-layer SDUs);

Retransmission function (retransmission of PDCP SDUs);

Ciphering and deciphering function (Ciphering and deciphering); and

Timer-based SDU removal function (timer-based SDU discard in uplink).

In the above examples, the reordering function of the PDCP layer (or a PDCH layer device) is a function of sequentially reordering PDCP PDUs received by a lower layer on the basis of a PDCP sequence number (SN). Reordering function of the PDCP layer may include a function of sequentially transferring the reordered data to a higher layer. Alternatively, the reordering function of the PDCP layer may include a function of directly transmitting the data without consideration of the orders thereof. Further, the reordering function of the PDCP layer may include a function of performing reordering and recording lost PDCP PDUs, a function of reporting states of the lost PDCP PDUs to the transmitting side, and a function of making a request for retransmitting the lost PDCP PDUs.

Main functions of the RLCs 2-10 and 2-35 may include some of the following functions:

Data transmission function (transfer of upper-layer PDUs);

Sequential delivery function (in-sequence delivery of upper-layer PDUs);

Non-sequential delivery function (out-of-sequence delivery of upper-layer PDUs);

ARQ function (error correction through ARQ);

Concatenation, segmentation, and reassembly function (concatenation, segmentation and reassembly of RLC SDUs);

Re-segmentation function (re-segmentation of RLC data PDUs);

Reordering function (reordering of RLC data PDUs);

Duplicate detection function (duplicate detection);

Error detection function (protocol error detection);

RLC SDU deletion function (RLC SDU discard); and

RLC reestablishment function (RLC reestablishment).

In the above description, the sequential delivery function (in-sequence delivery) of the RLC layer may be a function of sequentially transferring RLC SDUs received from a lower layer to a higher layer. When one RLC SDU is divided into a plurality of RLC SDUs and received, the sequential delivery function (in-sequence delivery) of the RLC layer may include a function of reassembling and then transmitting the RLC SDUs.

The sequential delivery function (in-sequence delivery) of the RLC layer may include a function of reordering the received RLC PDUs on the basis of an RLC sequence number (SN) or a PDCP sequence number (SN). The sequential delivery function (in-sequence delivery) of the RLC layer may include a function of performing reordering and recording lost RLC PDUs. The sequential delivery function (in-sequence delivery) of the RLC layer may include a function of reporting states of the lost RLC PDUs to the transmitting side and a function of making a request for retransmitting the lost RLC PDUs.

The sequential delivery function (in-sequence delivery) of the RLC layer may include a function of, if there is a lost RLC SDU, sequentially transferring only RLC SDUs preceding the lost RLC SDU to the higher layer.

The sequential delivery function (in-sequence delivery) of the RLC layer may include a function of, if a predetermined timer expires even though there are lost RLC SDUs, sequentially transferring all RLC SDUs received before the timer starts to the higher layer.

The sequential delivery function (in-sequence delivery) of the RLC layer may include a function of, if a predetermined timer expires even though there are lost RLC SDUs, sequentially transferring all RLC SDUs received up to now to the higher layer.

The RLC layer may sequentially process the received RLC PDUs regardless of sequence numbers (out-of-sequence delivery) and transfer the RLC PDUs to the PDCP layer.

When receiving segments, the RLC layer may receive segments stored in the buffer or to be received in the future, reconfigure the segments to be one complete RLC PDU, and then transfer the RLC PDU to the PDCP layer.

The RLC layer may not include a concatenation function. Alternatively, the MAC layer may perform the concatenation function, or the concatenation function may be replaced with a multiplexing function of the MAC layer.

In the above description, the non-sequential delivery function (out-of-sequence delivery) of the RLC layer may be a function of directly transferring RLC SDUs received from the lower layer to the higher layer regardless of the orders thereof. When one RLC SDU is divided into a plurality of RLC SDUs and received, the non-sequential delivery function (out-of-sequence delivery) of the RLC layer may include a function of reassembling and then transmitting the RLC SDUs. The non-sequential delivery function (out-of-sequence delivery) of the RLC layer may include a function of storing RLC SNs or PDCP SNs of the received RLC PDUs, reordering the same, and recording lost RLC PDUs.

The MACs 2-15 and 2-30 may be connected to a plurality of NR RLC layers configured in one UE and main functions of the NR MAC may include some of the following functions:

Mapping function (Mapping between logical channels and transport channels);

Multiplexing and demultiplexing function (multiplexing/demultiplexing of MAC SDUs);

Scheduling information report function (scheduling information reporting);

HARQ function (error correction through HARQ);

Logical channel priority control function (priority handling between logical channels of one UE);

UE priority control function (priority handling between UEs by means of dynamic scheduling);

MBMS service identification function (MBMS service identification);

Transport format selection function (transport format selection); and

Padding function (padding).

The PHY layers 2-20 and 2-25 perform an operation for channel-coding and modulating higher-layer data to generate OFDM symbols and transmitting the OFDM symbols through a radio channel or demodulating and channel-decoding the OFDM symbols received through the radio channel and transmitting the demodulated and channel-decoded OFDM symbols to the higher layer.

Meanwhile, the functions or the names of respective layers in the protocol structure described with reference to FIG. 2 may be changed.

Figure 3:
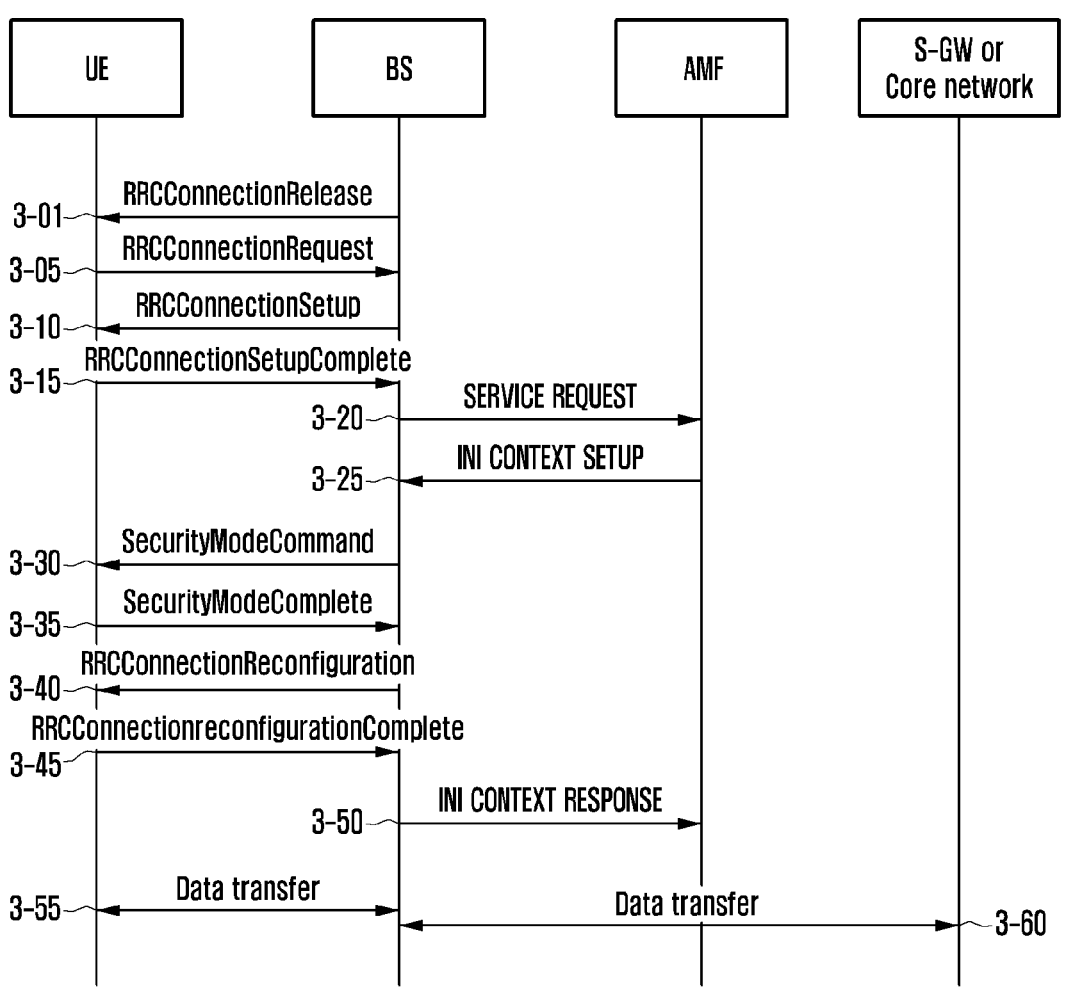
FIG. 3 illustrates a procedure in which, when the UE establishes a connection with a network in a communication system to which the disclosure can be applied, the UE performs a radio resource control (RRC) connection setup with a BS according to various embodiments of the present disclosure.

FIG. 3 illustrates an example of a procedure in which, when the UE establishes a connection with a network in a communication system according to various embodiments of the present disclosure, the UE performs a radio resource control (RRC) connection setup.

Referring to FIG. 3, when there is no data transmission/reception by the UE transmitting and receiving data in an RRC-connected mode (for example, referred to as an RRC connected mode, an RRC connected state, or a term having a meaning having the same or similar meaning) for a predetermined reason or for a predetermined time, the BS may transmit an RRC message (for example, an RRCConnectionRelease message) to the UE and the UE may switch to an RRC-idle mode (for example, referred to as an RRC idle mode, an RRC idle state, or a term having the same or similar meaning) in operation 3-01. In the future, when there is data to be transmitted, the UE having no configuration of the connection (for example, the UE in the idle mode) may perform an RRC connection configuration procedure (for example, an RRC connection establishment procedure) with the BS.

The UE performs synchronization with the BS through a random access procedure and transmits an RRC message (for example, an RRCConnectionRequest message) to the BS in operation 3-05. At this time, the RRC message may include an identifier of the UE and a reason (establishment cause) to establish the connection.

The BS may transmit an RRC message (for example, an RRCConnectionSetup message) to establish the RRC connection in operation 3-10. At this time, the RRC message may include at least one piece of configuration information for each logical channel, configuration information for each bearer, configuration information for a PDCP layer, configuration information for an RLC layer, or configuration information for a MAC layer. Further, the RRC message may allocate a bearer identifier (for example, an SRB identifier or a DRB identifier) for each bearer and indicate a configuration of the PDCP layer, the RLC layer, the MAC layer, or the PHY layer for each bearer. Further, the RRC message may indicate whether to perform a ciphering function or a deciphering function for the PDCP layer for each bearer or indicate an integrity protection function or whether to perform the integrity protection function. For example, the RRC message may include at least one of an indicator deactivating (disabling) the ciphering function for the PDCP layer for each bearer or an indicator activating (enabling) the integrity protection function.

The UE having established the RRC connection transmits an RRC message (for example, an RRCConnectionSetupComplete message) to the BS in operation 3-15. At this time, the RRC message may include a message (for example, a service request message) through which the UE makes a request for configuring a bearer for a predetermined service to the AMF or the MME. The BS may transmit the message included in the RRC message to the AMF or the MME in operation 3-20. The AMF or the MME may determine whether to provide the service requested by the UE.

When it is determined to provide the service requested by the UE on the basis of the determination result, the AMF or the MME may transmit a message (for example, an initial context setup request message) to the BS in operation 3-25. At this time, the message may include quality of service (QoS) information to be applied when the DRB is configured and security-related information to be applied to the DRB (for example, a security key and a security algorithm).

The BS may exchange security configuration-related message (for example, a SecurityModeCommand message and a SecurityModeComplete message) in order to configure security with the UE in operations 3-30 and 3-35. When the security is completely configured, the BS may transmit an RRC message (for example, an RRCConnectionReconfiguration message) to the UE in operation 3-40. At this time, the RRC message may allocate a bearer identifier (for example, an SRB identifier or a DRB identifier) for each bearer and indicate a configuration of the PDCP layer, the RLC layer, the MAC layer, or the PHY layer for each bearer. Further, the RRC message may indicate whether to perform a ciphering function or a deciphering function for the PDCP layer for each bearer or indicate an integrity protection function or whether to perform the integrity protection function. For example, the RRC message may include at least one of an indicator deactivating (disabling) the ciphering function for the PDCP layer for each bearer or an indicator activating (enabling) the integrity protection function. Further, the RRC message may include configuration information of the DRB to process user data, and the UE may configure the DRB by applying the information and transmit an RRC message (for example, an RRCConnectionReconfiguration-Complete message) to the BS in operation 3-45. The BS having completed the DRB configuration with the UE may transmit a message (for example, an initial context setup complete message) to the AMF or the MME and complete the connection.

When the procedure is fully completed, the UE may transmit and receive data through the BS and the core network in operations 3-55 and 3-60. According to an embodiment, the data transmission process may largely include an RRC connection establishment, a security configuration, and a DRB configuration, and the BS may transmit an RRC message (for example, an RRCConnectionReconfiguration message) in order to newly make, add, or change the configuration in the UE for a predetermined reason. At this time, the RRC message may allocate a bearer identifier (for example, an SRB identifier or a DRB identifier) for each bearer and indicate a configuration of the PDCP layer, the RLC layer, the MAC layer, or the PHY layer for each bearer. Further, the RRC message may indicate whether to perform a ciphering function or a deciphering function for the PDCP layer for each bearer or indicate an integrity protection function or whether to perform the integrity protection function. For example, the RRC message may include at least one of an indicator deactivating (disabling) the ciphering function for the PDCP layer for each bearer or an indicator activating (enabling) the integrity protection function.

As described above, the connection establishment procedure between the UE and the BS may be applied not only to the connection establishment between the UE and the BS in the NR system but also to the connection establishment between the UE and the LTE BS, and may also be applied to the connection establishment between the BS and the UE in various communication systems to which the disclosure can be applied. Further, in the procedure, the name of the message and information which can be included in the message may be changed.

Meanwhile, in the above-described communication system, the data transmission method having high reliability should be supported and it is required to strengthen security in order to deal with data transmission errors and attacks from unidentified and unspecified users. Meanwhile, as a method of enhancing data security, ciphering providing confidential to data or integrity protection providing integrity may be considered. To this end, a procedure of activating ciphering and integrity protection may be performed. Hereinafter, this is described in detail with reference to FIG. 4.

Figure 4:
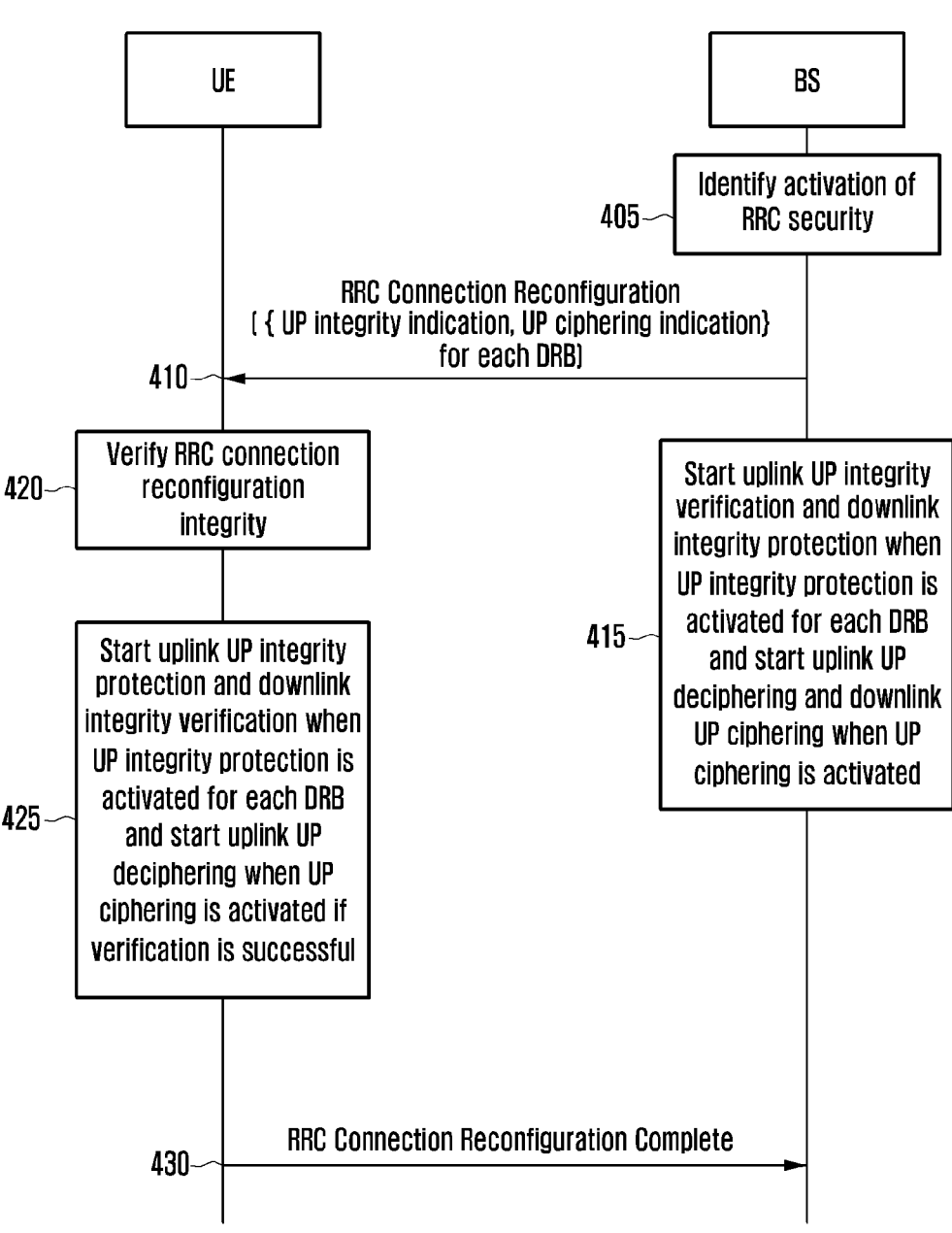
FIG. 4 illustrates a procedure of activating integrity protection or ciphering for data in a communication system according to various embodiments of the present disclosure.

FIG. 4 illustrates a procedure of activating ciphering or integrity protection in a communication system according to various embodiments of the present disclosure.

When the UE makes a request for transmitting data to the SMF (a network entity performing the SMF), the SMF may determine a UP security policy indicating whether to activate UP confidentiality or integrity for all DRBs belonging to a corresponding PDU session during a protocol data unit (PDU) session establishment procedure and transmit the UP security policy to the BS. The UP security policy may be used to activate UP confidentiality or UP integrity for all DRBs belonging to the corresponding PDU session by the BS. For example, when the UP security policy indicates "required" for UP confidentiality or UP integrity protection, the BS may activate UP confidentiality or UP integrity protection and apply the same to all traffic (data) in the corresponding PDU session. Alternatively, when the UP security policy indicates "not needed" for UP confidentiality or UP integrity protection, the BS may not activate UP confidentiality or UP integrity protection and not apply the same to the corresponding PDU session. Meanwhile, the BS may activate confidentiality or UP integrity protection for each DRB through RRC signaling described with reference to FIG. 3. That is, the BS may indicate activation of UP confidentiality or UP integrity protection to the UE according to the corresponding UP security policy through RRC signaling. Thereafter, the BS and the UE may perform a ciphering and integrity protection procedure on data according to whether the shared UP confidentiality or UP integrity protection is activated, so as to protect the corresponding data.

Meanwhile, referring to FIG. 4, the procedure of activating UP confidentiality or UP integrity protection may be performed as a portion of DRB addition (or modification) using the RRC connection reconfiguration procedure described with reference to FIG. 3.

The RRC connection reconfiguration procedure used to add (or modify) the DRB may be performed as a portion of an AS security mode command procedure after RRC security is activated. That is, the procedure may be performed after RRC security including RRC ciphering and RRC integrity protection is activated. Accordingly, in operation 405, the BS may identify whether RRC security is activated.

When RRC security is activated, the BS may transmit an RRC message (for example, an RRC connection reconfiguration message) including an indicator indicating whether ciphering for providing confidentiality of each DRB is activated or an indicator indicating whether integrity protection for providing integrity is activated to the UE according to the UP security policy received from the SMF in operation 410.

When integrity protection is activated for the DRB as indicated by the RRC message and the BS does not have a key (for example, K_UPint) used for UP integrity protection, the BS generates the key (K_UPint) and UP integrity protection for the DRB is started by the BS in operation 415. Similarly, when ciphering is activated for the DRB as indicated by the RRC message and the BS does not have a key (for example, K_UPEnc) used for UP ciphering, the BS generates the key (K_UPEnc) and UP ciphering for the DRB is started by the BS.

In operation 420, the UE may verify the RRC message received from the BS.

In the case in which verification is successful, when integrity protection is activated for the DRB as indicated by the RRC message and the UE does not have a key (for example, K_UPint) used for UP integrity protection, the UE generates the key (K_UPint) and UP integrity protection for the DRB is started by the UE.

Similarly, when ciphering is activated for the DRB as indicated by the RRC message and the UE does not have a key (for example, K_UPEnc) used for UP ciphering, the UE generates the key (K_UPEnc) and UP ciphering for the DRB is started by the UE.

Thereafter, when the UE successfully verifies integrity of the RRC message, the UE may transmit an RRC message (for example, an RRC connection reconfiguration complete message) to the BS in operation 430.

Meanwhile, when UP integrity protection is not activated for the DRB, the BS and the UE do not protect integrity of data (or traffic) transmitted and received in the corresponding DRB, do not generate information (for example, message authentication code-integrity (MAC-I) for integrity protection of data by the BS and the UE, and do not insert the same into a packet including (or carrying) the data.

Further, when UP ciphering is not activated for the DRB, the BS and the UE do not cipher data (or traffic) transmitted and received in the corresponding DRB.

Meanwhile, in the disclosure, the ciphering and integrity protection procedure for enhancing security of data may be performed in a specific layer due to the above-described protocol structure. This is described in detail with reference to FIG. 5.

Figure 5:
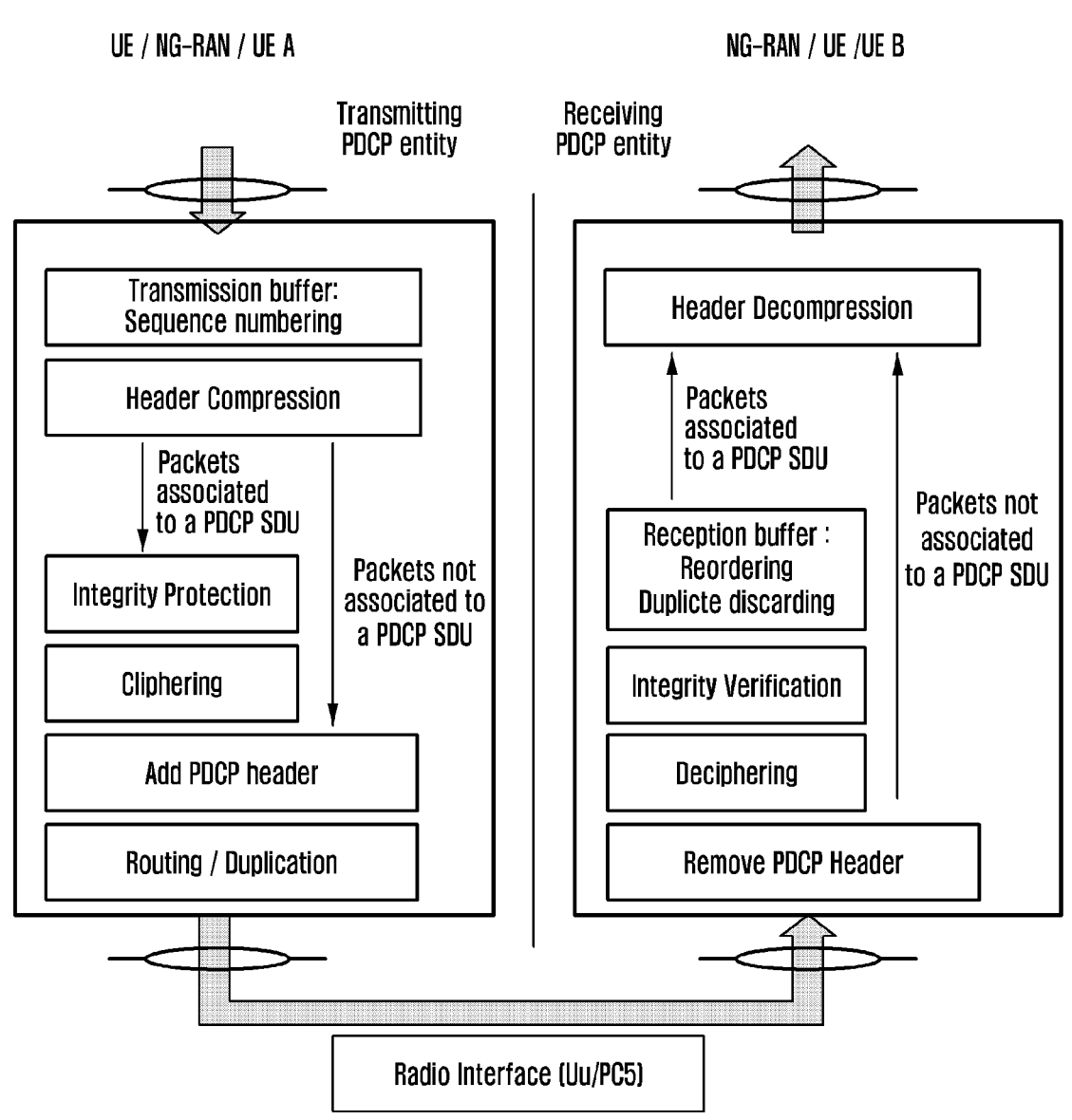
FIG. 5 illustrates a layer performing integrity protection or ciphering on data among protocol layers in a communication system according to various embodiments of the present disclosure.

FIG. 5 illustrates a layer performing integrity protection or ciphering on data among protocol layers in a communication system according to various embodiments of the present disclosure.

In FIG. 5, a PDCP layer is described as an example of the layer performing data ciphering and integrity protection. However, the disclosure is not limited thereto, and the layer performing data ciphering and integrity protection according to the disclosure may be changed and is not limited by the name. Further, the disclosure can be applied to even the case in which ciphering and integrity protection are performed in at least one layer.

Referring to FIG. 5, a PDCP layer of a transmitter may perform integrity protection on data according to a security configuration and cipher the same. Meanwhile, a PDCP layer of a receiver may decipher a received packet and perform integrity verification. When there is no error in deciphering and integrity verification, the PDCP layer of the receiver may perform a procedure of recording the corresponding packet, detecting duplicate packets, compressing and decompressing a header, and the like.

Figure 6:
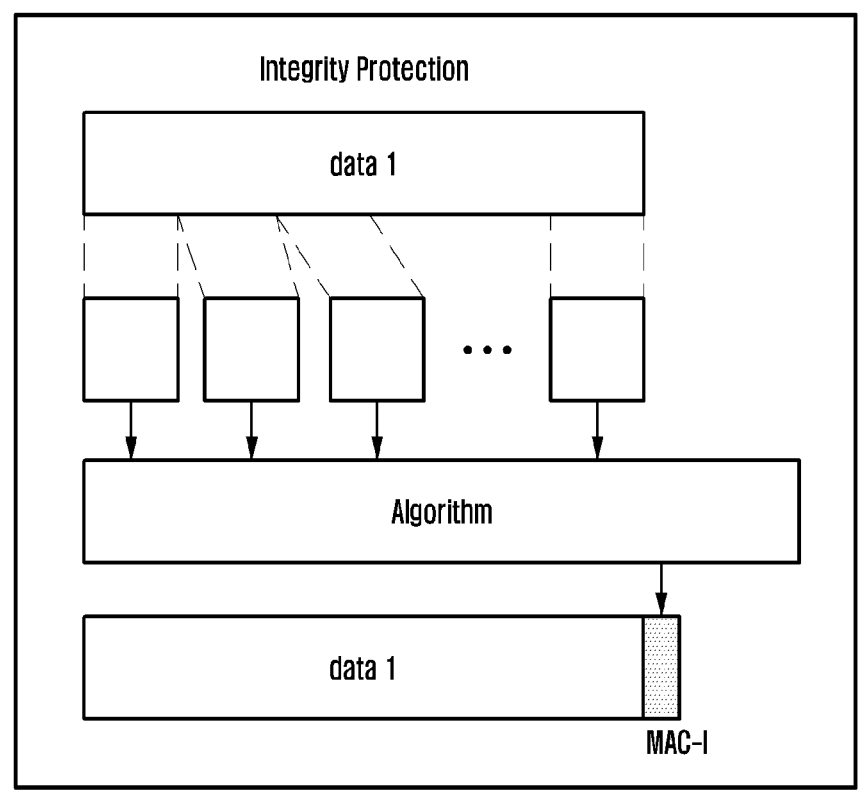
FIG. 6 illustrates an example of integrity protection for providing integrity of data in a communication system according to various embodiments of the present disclosure.

FIG. 6 illustrates an example of integrity protection for providing integrity of data in a communication system according to various embodiments of the present disclosure.

Referring to FIG. 6, the PDCP layer of the transmitter may perform an integrity protection procedure on the basis of a security key induced or applied by a higher layer (for example, the RRC layer or the non-access stratum (NAS) layer), a COUNT value corresponding to data of which integrity is to be protected, or bearer identifiers corresponding to data. For example, the PDCP layer of the transmitter may calculate data of which integrity is to be protected in units of specific bytes (for example, 8 bytes (64 bits)) according to an integrity protection algorithm, calculate a MAC-I of specific types (for example, 4 bytes (32 bits)), and attach the same to the end of data. Meanwhile, the PDCP layer of the receiver may compare X-MAC acquired by applying an integrity verification algorithm to the received data with the MAC-I and, when the two values are the same as each other, determine that integrity verification for the received data is successful.

Alternatively, when the two values are different from each other, it may be determined that integrity verification fails and the received data may be discarded. Meanwhile, in the disclosure, the integrity protection algorithm and the integrity verification algorithm may include at least one of EIA0, EIA1, and EIA2 or may use various other algorithms. The procedure for integrity protection described with reference to FIG. 6 corresponds to only an example and the disclosure is not limited thereto. Accordingly, integrity protection of data may be performed according to various methods of providing integrity to data in which case the disclosure can be applied.

Figure 7:
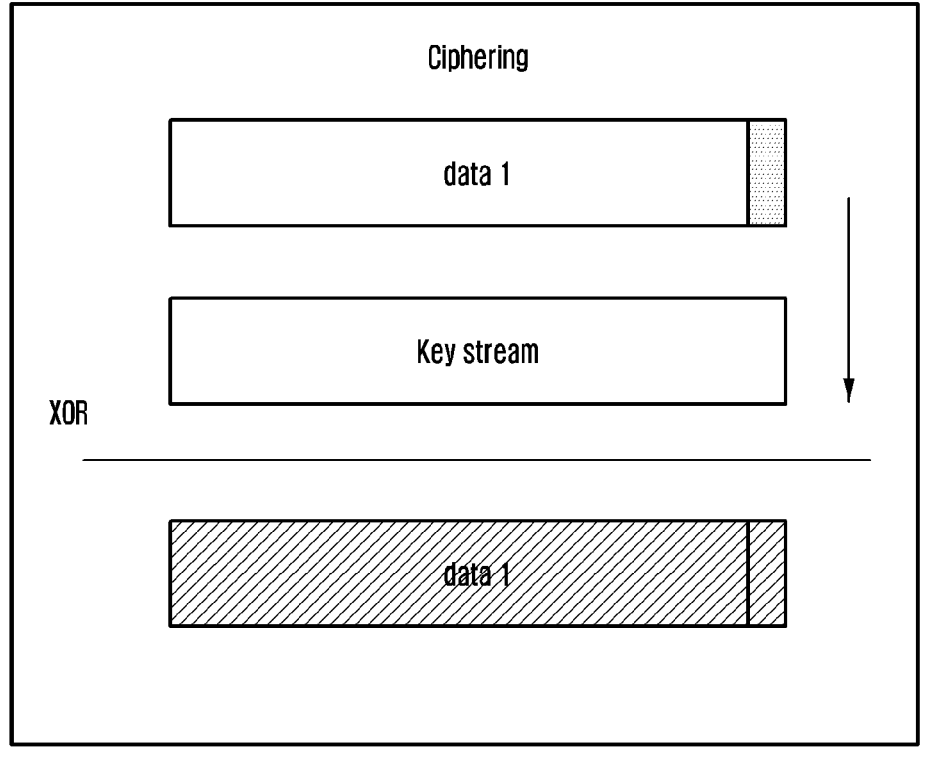
FIG. 7 illustrates an example of ciphering for providing confidentiality of data in a communication system according to various embodiments of the present disclosure.

FIG. 7 illustrates an example of ciphering for providing confidentiality of data in a communication system according to various embodiments of the present disclosure.

Referring to FIG. 7, the PDCP layer of the transmitter may generate a key stream having the same length as the data to be ciphered through a ciphering algorithm on the basis of a security key induced or applied by a higher layer (for example, the RRC layer or the non-access stratum (NAS) layer), a COUNT value corresponding to data to be ciphered, or bearer identifiers corresponding to data. Thereafter, it is possible to generated ciphered data by performing a XOR procedure on the generated key stream and the data to be ciphered. Meanwhile, the PDCP layer of the receiver may perform the XOR procedure on the generated key stream and the ciphered data to perform deciphering through a deciphering algorithm. Meanwhile, in the disclosure, the ciphering algorithm and the deciphering algorithm may include at least one of EEA0, EEA1, EEA2, or EEA3 and may use various other algorithms. The procedure for ciphering described with reference to FIG. 7 corresponds to only an example and the disclosure is not limited thereto. Accordingly, data ciphering may be performed according to various methods of providing confidentiality to data, in which case the disclosure can be applied.

Figure 8:
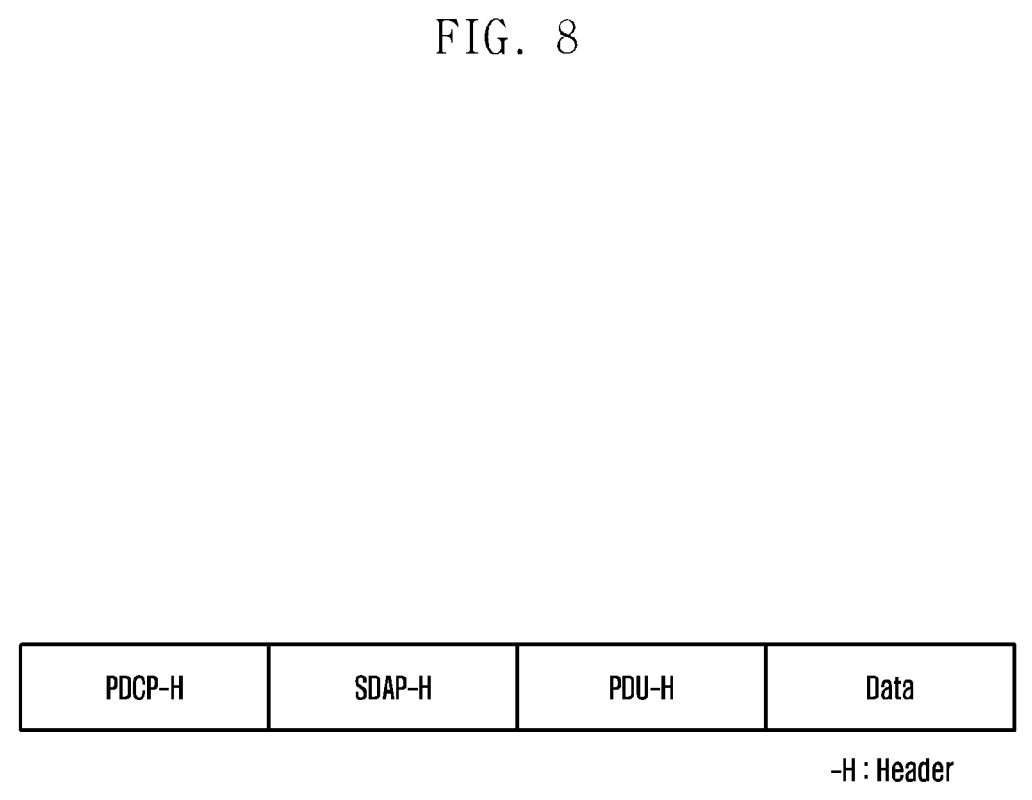

FIG. 8 illustrates an example of a packet structure in a layer performing data ciphering and integrity protection in a communication system according to various embodiments of the present disclosure.

Referring to FIG. 8, a packet structure of the PDCP layer is illustrated. In the disclosure, each layer transmitting data adds information related to data (for example, a header of the corresponding layer or additional information) to the data and transfer the same to the lower layer in the protocol structure. For example, the protocol data unit (PDU) layer adds a PDU header (PDU-H) to data and transfers a packet including the PDU header and data to the SDAP layer corresponding to a lower layer. The SDAP layer adds an SDAP header (SDAP-H) to the packet received from the PDU layer and transfers the same to the PDCP layer corresponding to a lower layer. The PDCP layer performs integrity protection or ciphering on the packet received from the SDAP layer and transfers a packet to which a PDPC header (PDCP-H) is added to a lower layer (for example, the RLC layer). Meanwhile, when the PDCP layer performs integrity protection on the packet, information (for example, MAC-I) for integrity protection of the corresponding packet is generated and added (or inserted) to be located after the data within the packet. Further, when the PDCP layer performs ciphering for providing confidentiality, a part except for the SDAP header within the packet is ciphered.

Meanwhile, data transmission and reception in the communication system to which the disclosure can be applied may be performed via many layers according to the above-described protocol structure, and some layers thereof (for example, the PDCP layer) may provide security for data. In the communication system, although the data has been already ciphered, the data may be overlappingly ciphered. Hereinafter, this will be described in detail with reference to FIGS. 9A to 10.

Figure 9A:
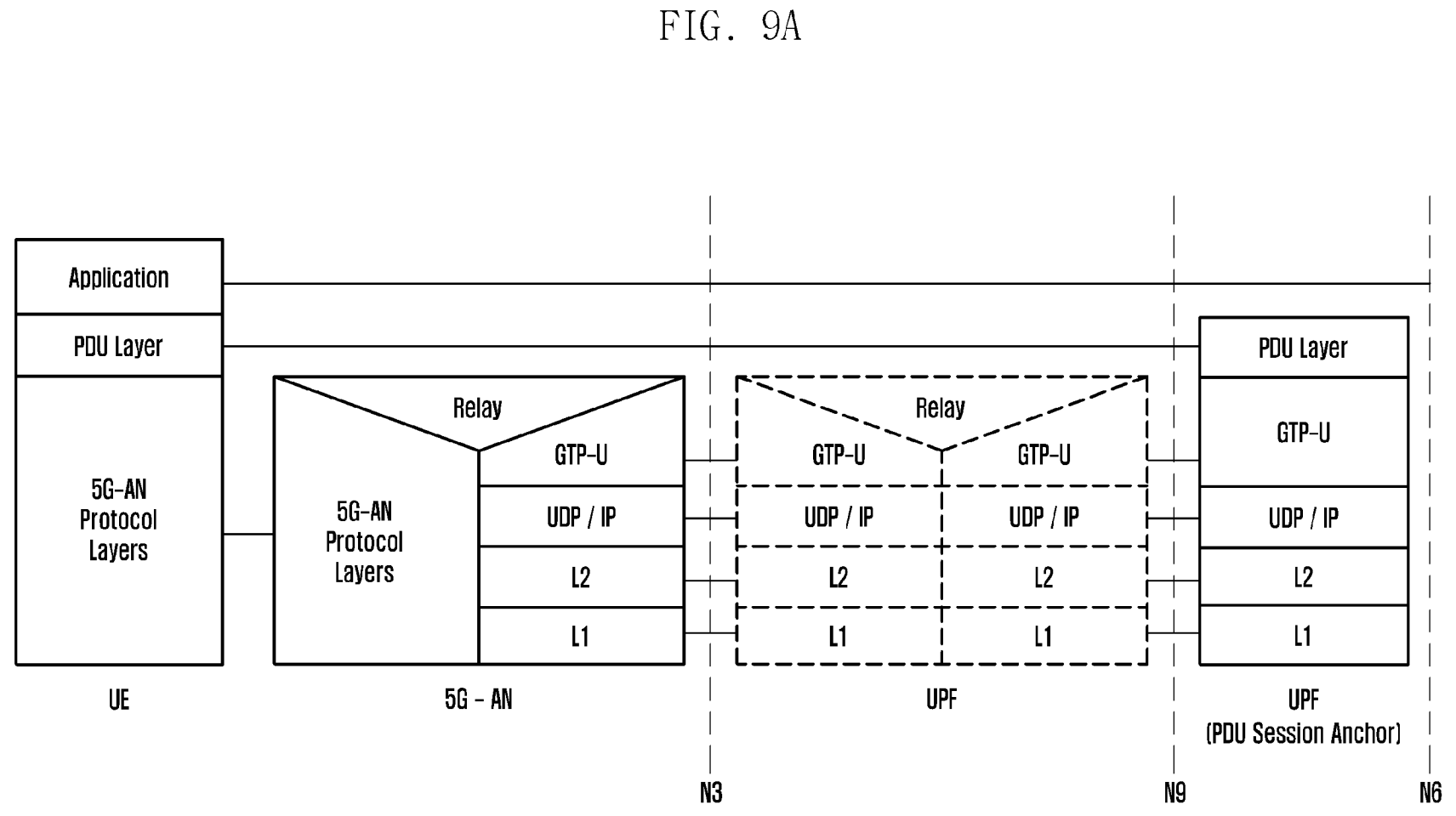
Figure 9B:
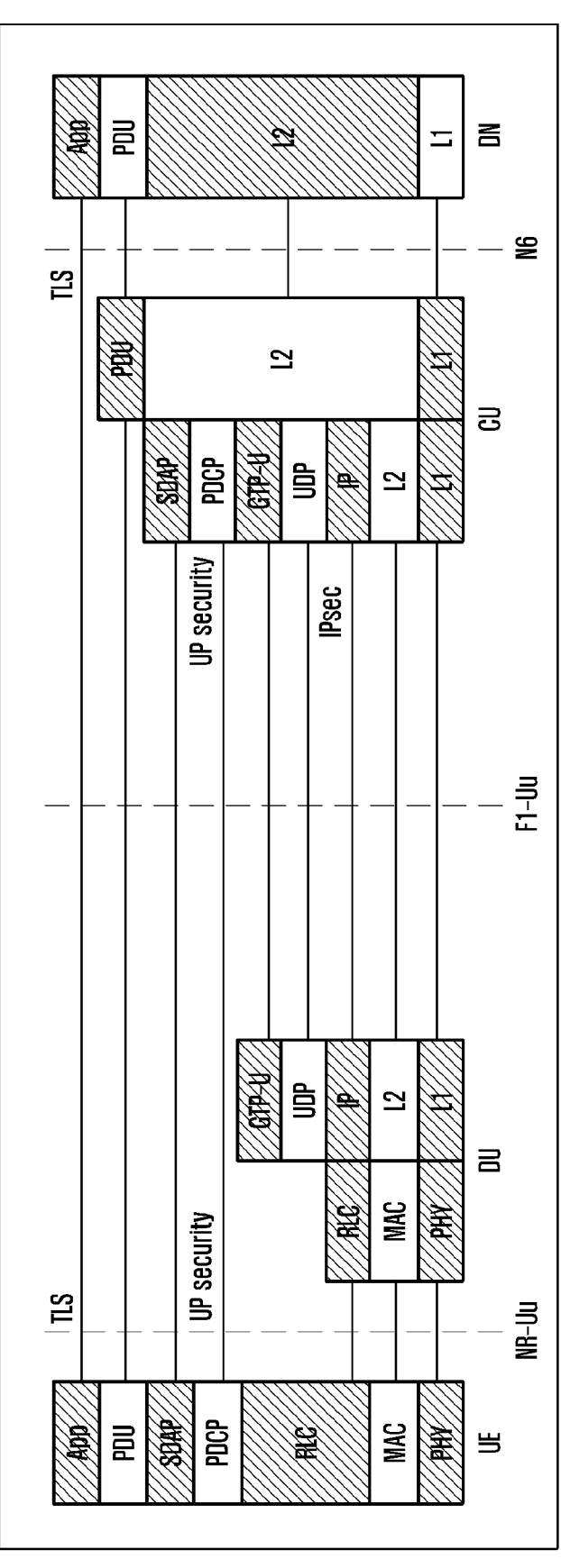
FIG. 9B illustrates an example of a protocol structure in which data can be transmitted and received in a communication system according to various embodiments of the present disclosure.

FIGS. 9A and 9B illustrate an example of a UP protocol structure in which data can be transmitted and received in a communication system according to various embodiments of the present disclosure.

Referring to FIGS. 9A and 9B, when data is transmitted, the data may be transmitted to the UE via at least one layer in a data network (DA). Meanwhile, some layers of the layers through which the data passes may provide security for the data. For example, when data is application data, the application layer may protect the data by application security such as transport layer security (TLS). Further, for example, when the SMF configures the UP security policy as "required" in order to protect data in F1-U section and NR-Uu section illustrated in FIG. 9B and the BS indicates the same, the BS activate security (for example, integrity protection or ciphering) for the data according to the UP security policy and the PDCP layers of the UE and the BS perform integrity protection or ciphering for the corresponding data. In this case, although the data has been already ciphered, the PDCP layer may overlappingly cipher the data.

Meanwhile, the protocol structure illustrated in FIGS. 9A and 9B is only an example for convenience of description, and the disclosure is not limited thereto. Names and functions of respective layers within the protocol structure illustrated in FIGS. 9A and 9B may be changed, and an interface between the CU and the DU may also be changed. Further, the disclosure can be applied to a protocol structure that does not consider separation of functions of the CU and the DU.

Figure 10:
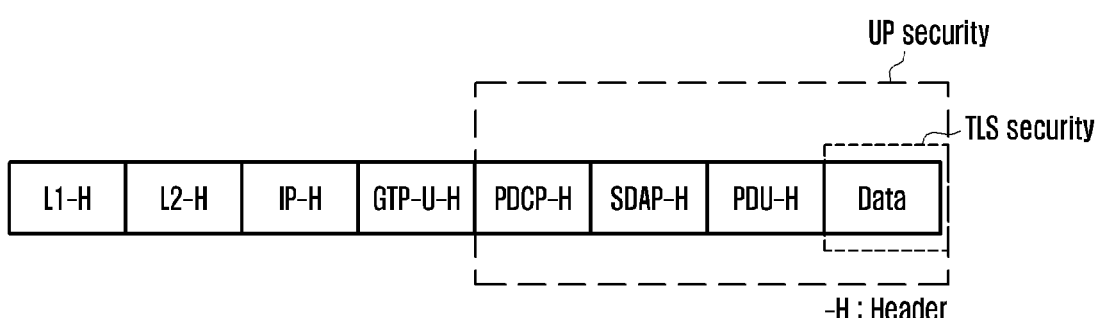
FIG. 10 illustrates a packet structure in a communication system according to various embodiments of the present disclosure.

FIG. 10 illustrates an example of a packet structure in a communication system according to various embodiments of the present disclosure.

FIG. 10 illustrates a structure of a packet including data in F1-U section when the application layer and the PDCP layer cipher the data as described with reference to FIG. 9.

Referring to FIG. 10, the case in which UP security (for example, ciphering) is provided for the PDCP-H, the SDAP-H, the PDU-H, and data, and TLS security (for example, ciphering) is provided for data is illustrated. As described above, when the application layer and the PDCP layer perform ciphering, data within the packet is overlappingly ciphered. As described with reference to FIGS. 6 and 7, ciphering is a procedure having high calculation complexity and needing many calculation resources and calculation time, but security of data is not significantly improved to be larger than or equal to a predetermined threshold value compared to a huge increase in calculation resources and calculation time spent whenever ciphering is overlappingly performed. Accordingly, this may cause an inefficient communication system.

Meanwhile, in a communication system to which the disclosure can be applied or in a next-generation communication system such as a 6G communication system, an efficient data transmission method having high reliability and low latency should be supported. Accordingly, the disclosure provides various embodiments for solving a problem of communication delay according to calculation resource consumption and a calculation time increase due to overlapping ciphering of data. According to an embodiment, a method of identifying whether data is ciphered, and an apparatus and a system for performing the same are provided. According to an embodiment, a method of selectively providing security of data (for example, ciphering or integrity protection) on the basis of whether the data is ciphered, and an apparatus and a system for performing the same are provided. According to an embodiment, a method of indicating selective provision of data (for example, ciphering or integrity protection) on the basis of whether the data is ciphered, and an apparatus and a system for performing the same are provided. According to an embodiment, when security of data is provided, a packet structure for improving calculation efficiency is provided. Hereinafter, embodiments provided in the disclosure are described in detail.

In the conventional communication system, the UE or the network entity (for example, the BS, the BS, or a specific network entity of the core network) cannot identify whether ciphered data is transmitted, and thus, when security is applied to data, the security is applied to all packets including the data. Accordingly, when the data corresponds to already ciphered data, the data is overlappingly ciphered. Meanwhile, according to an embodiment provided in the disclosure, a selective UP security method of performing ciphering or integrity protection only for information (for example, the header of each protocol layer or additional information) related to the data within the packet or performing ciphering or integrity protection for the data on the basis of a determination about whether data (or payload) within the transmitted and received packet is ciphered by the UE or the network entity of the communication system, and an apparatus and a system for performing the same.

As described above, in order to selectively perform ciphering or integrity protection for the data according to whether the data within the packet is ciphered, whether the data transmitted and received between the UE and the DN is ciphered may be first identified. Meanwhile, whether the data is ciphered may be determined by a transmitter configured to generate and transmit data, a receiver configured to receive data, or a node configured to transmit data between the transmitter and the receiver, and a UP security procedure for each entity configured to determine whether the data is ciphered is provided in the disclosure.

Figure 11:
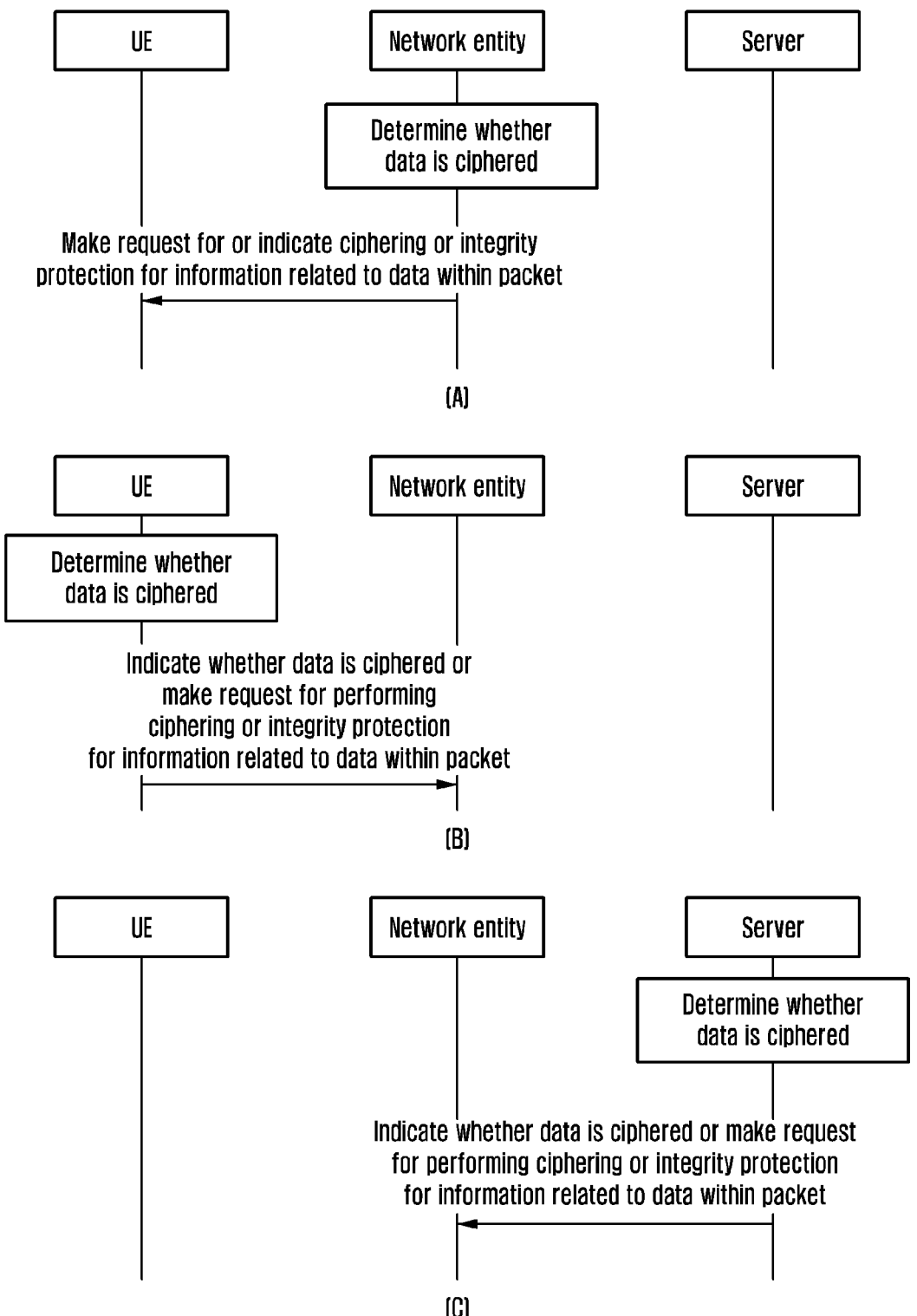
FIG. 11 illustrates a UP security procedure according to various embodiments of the present disclosure.

FIG. 11 illustrates a UP security procedure according to various embodiments of the present disclosure.

Specifically, referring to FIG. 11, the UP security procedure according to an embodiment may include at least one of the following elements or a combination of some thereof.

In one example of A, the network entity (for example, the BS or a specific network entity of the core network) of the communication system may determine (or recognize) whether transmitted and received data is ciphered. When data is ciphered data on the basis of the determination result, the network entity may make a request for or indicate performing ciphering or integrity protection for some or all of the ciphered data within the packet and information (for example, the header of the protocol layer or additional information) related to the data to the network entity.

In one example of B, when security is provided for transmitted and received data, the UE of the communication system may notify the network entity (for example, the BS or the specific network entity of the core network) whether the data is ciphered or make a request for performing ciphering or integrity protection for some or all of the ciphered data within the packet or some or all of the information (for example, the header of the protocol layer or additional information) related to the data to the network entity.

In one example of C, when security is provided for transmitted and received data, the server outside the communication system may notify the network entity (for example, the BS or the specific network entity of the core network) whether the data is ciphered or make a request for performing ciphering or integrity protection for some or all of the ciphered data within the packet or some or all of the information (for example, the header of the protocol layer or additional information) related to the data to the network entity.

Meanwhile, in the disclosure, data may be ciphered on the basis of transport layer security (TLS), secure sockets layer (SSL), Internet protocol security (IPSec), virtual private network (VPN), hypertext transfer protocol secure (HTTPS), simple network management protocol (SNMP), domain name system security extensions (DNSSEC), medium access control security (MACSec), or various other protocols. According to an embodiment, whether data is ciphered may be identified through a determination about whether the data is ciphered on the basis of at least one of the above protocols. Hereinafter, the method is described in detail with reference to FIGS. 12 to 14.

Figure 12:
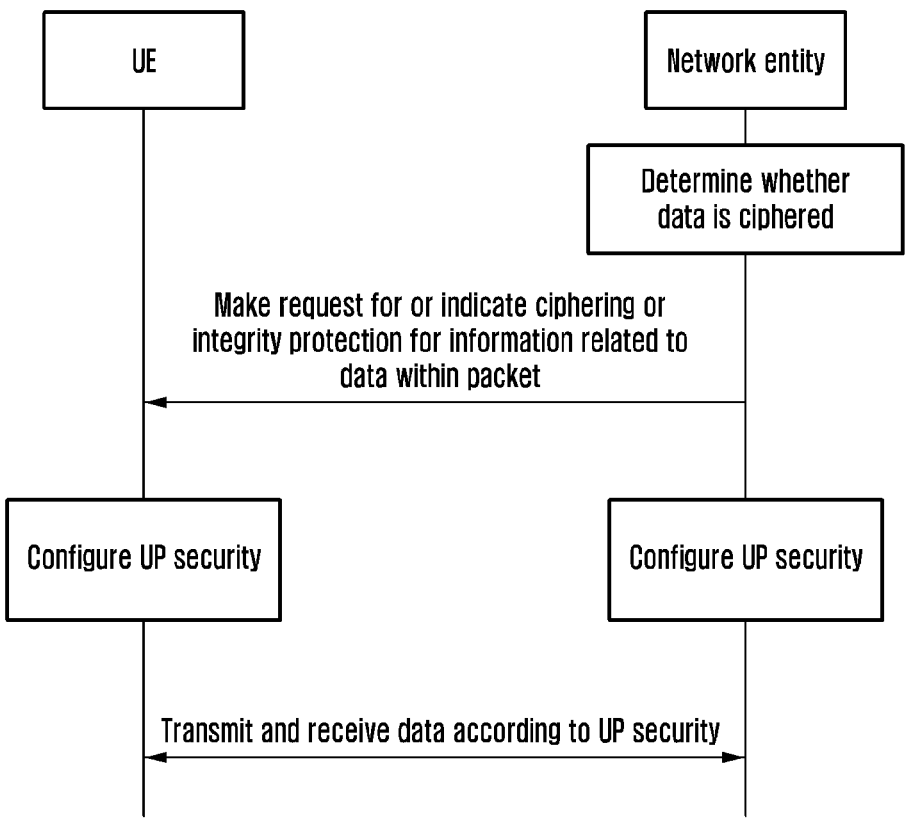
FIG. 12 illustrates a UP security procedure based on whether data is ciphered according to various embodiments of the present disclosure.

FIG. 12 illustrates a UP security procedure based on whether data is ciphered according to various embodiments of the present disclosure.

Referring to FIG. 12, a network entity (for example, the BS or a specific network entity of the core network) of the communication system may be located between the UE and the server and may transfer data received from the server to the UE or transfer data received from the UE to the server. Further, the network entity may transmit data even though the UE moves. In such a process, the network entity may inspect the packet transmitted and received between the UE and the server and identify whether the corresponding packet is ciphered on the basis of a ciphering protocol (for example, at least one of the TLS, the SSL, the IPSec, the VPN, the HTTPS, the SNMP, the DNSSEC, the MACSec, or various other protocols) in the packet inspection. Accordingly, it may be determined whether the data within the packet is ciphered. The ciphering protocol generates a packet structure according to a determined rule. For example, when it is identified that the packet has a specific structure associated with the ciphering protocol through the packet inspection, the network entity may identify that the packet is ciphered on the basis of the ciphering protocol and accordingly identify that the data within the packet is ciphered. Meanwhile, according to an embodiment, the network may inspect the packet of corresponding IP flow for each IP flow associated with at least one of a specific quality of service (QoS) requirement, QoS flow indicator (QFI), guaranteed bit rate (GBR), or non-GBR. At this time, the number of packets checked to determine whether the data within the packet of the IP flow is ciphered may be determined in advance as a specific number. Alternatively, all packets of the corresponding IP flow may be checked.

Alternatively, the number of packets checked for the corresponding IP flow may be determined on the basis of at least one of a specific QoS requirement, QoS flow (QFI), GBR, or non-GBR associated with the corresponding IP flow. According to another embodiment, the network entity may perform inspection of packets transmitted and received for each DRB in which case the number of packets inspected to determine whether data within the packet transmitted and received in the corresponding DRB is ciphered may be determined in advance as a specific number.

Alternatively, all packets transmitted and received in the corresponding DRB may be inspected, and the number of packets inspected for the corresponding DRB may be determined on the basis of at least one of a QoS requirement, QoS flow, GBR, or non-GBR associated with the corresponding DRB. According to another embodiment, the network entity may perform inspection of packets transmitted and received for each PDU session in which case the number of packets inspected to determine whether data within the packet transmitted and received in the corresponding PDU session is ciphered may be determined in advance as a specific number or all packets transmitted and received in the corresponding PDU session may be inspected. Meanwhile, after inspecting the packet, the network entity may identify whether the packet is ciphered from the UE or the server through NAS signaling, RRC signaling, or various other control signaling. When it is identified that the data within the packet is ciphered, the network entity may inform the UE that the corresponding data is ciphered.

For example, the network entity may inform the UE whether the data is ciphered through NAS signaling, RRC signaling, or various other control signaling. Alternatively, the network entity may configure UP security in the UE by making a request for or indicating performing ciphering or integrity protection only for some or all of the information (for example, the header of the protocol layer or additional information) related to the data except for the ciphered data within the packet to the UE.

Alternatively, the network entity may configure UP security in the UE by making a request for or indicating performing ciphering or integrity protection only some or all of the ciphered data within the packet and some or all of the information (for example, the header of the protocol layer or additional information) related to the data. For example, the network entity may configure UP security in the UE through NAS signaling, RRC signaling, or various other control signaling. Meanwhile, the configuration of UP security may be performed according to the procedure described with reference to FIG. 4. For example, the network entity may configure UP security in the UE by transmitting an RRC message including an indicator indicating ciphering or integrity protection only for some or all of the information (for example, the header of the protocol layer or additional information) related to the data except for the ciphered data within the packet.

Alternatively, the network entity may configure UP security in the UE by transmitting an RRC message including an indicator indicating ciphering for some or all of the ciphered data within the packet and some or all of the information (for example, the header of the protocol layer or additional information) related to the data to the UE. Further, when it is identified that the data within the packet is ciphered, the network entity may perform ciphering or integrity protection only for some or all of the information (for example, the header of the protocol layer or additional information) related to the data except for the ciphered data within the packet. Alternatively, the network entity may perform ciphering or integrity protection for some or all of the ciphered data within the packet and some or all of the information (for example, additional information or the header of the protocol layer) related to the data.

Meanwhile, the embodiment described with reference to FIG. 12 may be applied to all of the transmission and reception of the uplink and the downlink.

Figure 13:
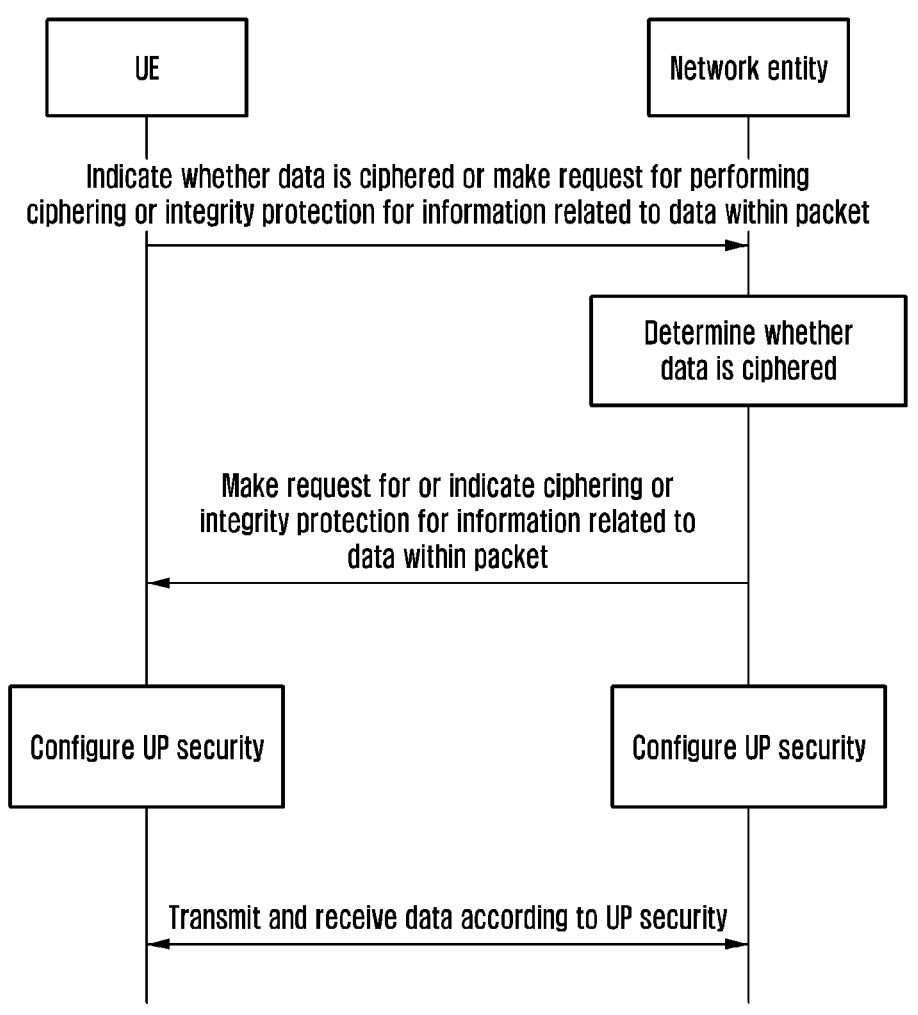
FIG. 13 illustrates a UP security procedure based on whether data is ciphered according to various embodiments of the present disclosure.

FIG. 13 illustrates a UP security procedure based on whether data is ciphered according to various embodiments of the present disclosure.

Referring to FIG. 13, when the UE in the communication system provides security for transmitted and received data, the UE may inform a network entity in the communication system (for example, the BS or a specific network entity of the core network) of the provision of security. For example, the UE may inform the network entity that transmitted and received data is ciphered data, which may be performed through NAS signaling, RRC signaling, or various other control signaling.

Alternatively, the UE may make a request for performing ciphering or integrity protection only for some or all of the information (for example, the header of the protocol layer or additional information) related to the data except for the ciphered data within the packet to the network entity, which may be performed through NAS signaling, RRC signaling, or various other control signaling.

Alternatively, the UE may make a request for performing ciphering or integrity protection for some or all of the ciphered data within the packet and information (for example, the header of the protocol layer or additional information) related to the data to the network entity, which may be performed through NAS signaling, RRC signaling, or various other control signaling. Through the notification or the request, the network entity may identify whether the data within the packet transmitted and received between the UE and the server is ciphered. The network entity may operate on the basis of trust of the notification or the request. For example, the network entity may configure UP security in the UE by indicating ciphering or integrity protection for some or all of the information (for example, the header of the protocol layer or additional information) related to the data except for the ciphered data within the packet on the basis of the notification or the request, which may be performed through NAS signaling, RRC signaling, or various other control signaling.

Alternatively, the network entity may configure UP security in the UE by indicating ciphering or integrity protection for some or all of the ciphered data within the packet and some or all of the information (for example, the header of the protocol layer or additional information) related to the data to the UE on the basis of the notification or the request, which may be performed through NAS signaling, RRC signaling, or various other control signaling. Meanwhile, the configuration of UP security may be performed according to the procedure described with reference to FIG. 4. For example, the network entity may configure UP security in the UE by transmitting an RRC message including an indicator indicating ciphering or integrity protection only for some or all of the information (for example, the header of the protocol layer or additional information) related to the data except for the ciphered data within the packet.

Alternatively, the network entity may configure UP security in the UE by transmitting an RRC message including an indicator indicating ciphering or integrity protection for some or all of the ciphered data within the packet and some or all of the information (for example, the header of the protocol layer or additional information) related to the data to the UE. Further, when it is identified that the data within the packet is ciphered, the network entity may perform ciphering or integrity protection only for some or all of the information (for example, the header of the protocol layer or additional information) related to the data except for the ciphered data within the packet. Alternatively, the network entity may perform ciphering or integrity protection for some or all of the ciphered data within the packet and some or all of the information (for example, the header of the protocol layer) related to the data.

Meanwhile, the embodiment described with reference to FIG. 13 may be applied to all of the transmission and reception of the uplink and the downlink.

Although the method describes data transmission and reception between the UE and the network entity in the communication system, the disclosure is not limited thereto. For example, the method may be applied to communication between UEs (for example, device to device (D2D) communication, sidelink communication, or vehicle to everything (V2X) communication). In this case, the transmission UE may determine whether data within the packet to be transmitted is ciphered by inspecting the packet. When it is identified that the data within the packet is ciphered on the basis of the packet inspection result, the transmission UE may perform ciphering or integrity protection only for some or all of the information (for example, the header of the protocol layer or additional information) related to the data except for the ciphered data within the packet. Alternatively, the transmission UE may perform ciphering or integrity protection for some or all of the ciphered data within the packet and some or all of the information (for example, the header of the protocol layer or additional information) related to the data.

Meanwhile, the network entity may perform an operation of verifying whether the data within the packet is actually ciphered by inspecting the packet transmitted and received between the UE and the server as described with reference to FIG. 12 or may verify reliability of the notification or the request from the UE through the server outside the communication system. For example, the network entity may make a request for verifying the notification or the request from the UE to the server, and the server may verify reliability of the notification or the request from the server on the basis of whether the UE is included in a reliable UE list, information used for communication between the server and the UE (for example, secret information such as credential), or various methods such as third party credential authority (CA), and then inform the network entity of the verification result.

Figure 14:
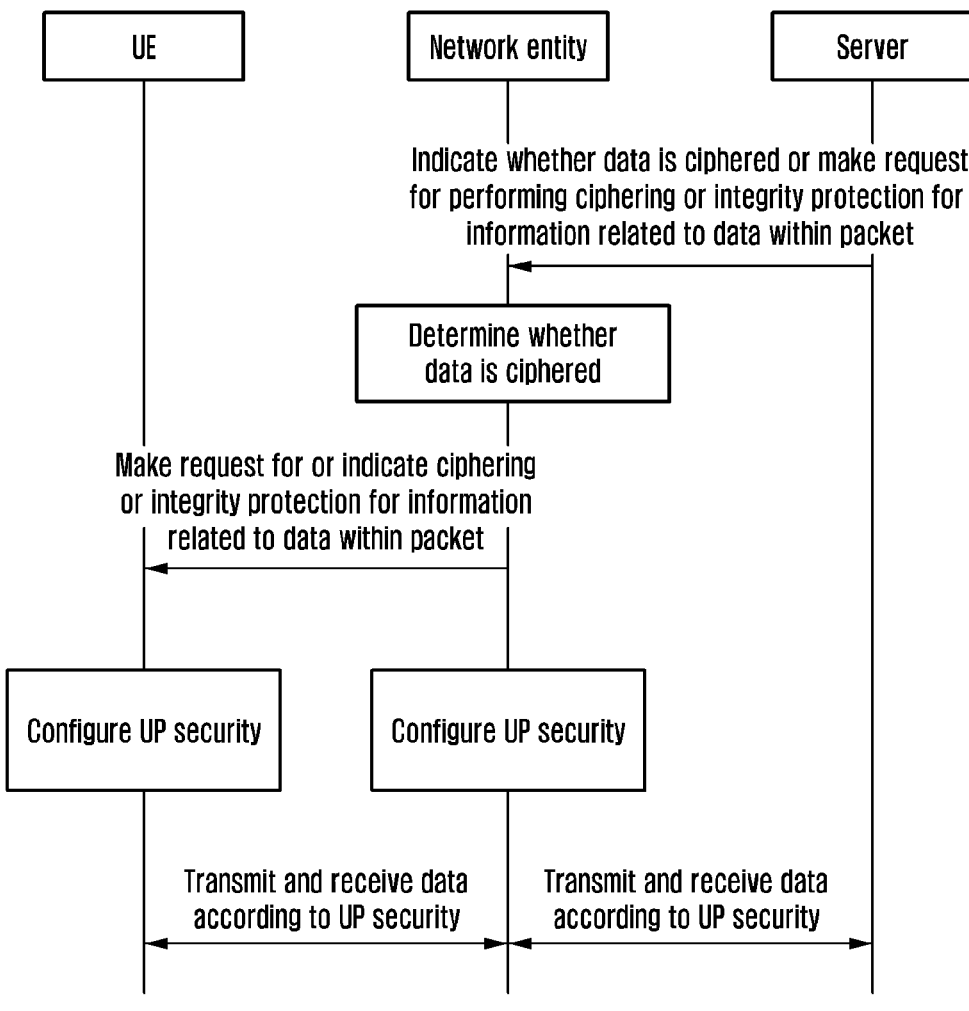
FIG. 14 illustrates a UP security procedure based on whether data is ciphered according to various embodiments of the present disclosure.

FIG. 14 illustrates a UP security procedure based on whether data is ciphered according to various embodiments of the present disclosure.

Referring to FIG. 14, when security is provided for data transmitted and received by a server outside the communication system, a network entity (for example, the BS or a specific network entity of the core network) of the communication system may be informed of the provision of security. For example, the server may inform the network entity that transmitted and received data is ciphered data.

Alternatively, the server may make a request for performing ciphering or integrity protection only for some or all of the information (for example, the header of the protocol layer or additional information) related to the data except for the ciphered data within the packet to the network entity. Alternatively, the server may make a request for performing ciphering or integrity protection for some or all of the ciphered data within the packet and information (for example, the header of the protocol layer or additional information) related to the data to the network entity. Through the notification or the request, the network entity may identify whether the data within the packet transmitted and received between the UE and the server is ciphered. The network entity may operate on the basis of trust of the notification or the request. For example, the network entity may configure UP security in the UE by indicating ciphering or integrity protection for some or all of the information (for example, the header of the protocol layer or additional information) related to the data except for the ciphered data within the packet on the basis of the notification or the request, which may be performed through NAS signaling, RRC signaling, or various other control signaling.

Alternatively, the network entity may configure UP security in the UE by indicating ciphering or integrity protection for some or all of the ciphered data within the packet and some or all of the information (for example, the header of the protocol layer or additional information) related to the data to the UE on the basis of the notification or the request, which may be performed through NAS signaling, RRC signaling, or various other control signaling. Meanwhile, the configuration of UP security may be performed according to the procedure described with reference to FIG. 4. For example, the network entity may configure UP security in the UE by transmitting an RRC message including an indicator indicating ciphering or integrity protection only for some or all of the information (for example, the header of the protocol layer or additional information) related to the data except for the ciphered data within the packet to the UE. Alternatively, the network entity may configure UP security in the UE by transmitting an RRC message including an indicator indicating ciphering for some or all of the ciphered data within the packet and some or all of the information (for example, the header of the protocol layer or additional information) related to the data to the UE.

Further, when it is identified that the data within the packet is ciphered, the network entity may perform ciphering or integrity protection only for some or all of the information (for example, the header of the protocol layer or additional information) related to the data except for the ciphered data within the packet. Alternatively, the network entity may perform ciphering or integrity protection for some or all of the ciphered data within the packet and some or all of the information (for example, the header of the protocol layer) related to the data.

Meanwhile, the network entity may perform an operation of verifying whether the data within the packet is actually ciphered by inspecting the packet transmitted and received between the UE and the server as described with reference to FIG. 12 or may verify reliability of the notification or the request from the server through the UE. For example, the network entity may make a request for verifying the notification or the request from the server to the UE, and the UE may verify reliability of the notification or the request from the server on the basis of various methods such as a list of reliable communication targets, information used for communication between the server and the UE (for example, secret information such as credential), or third party credential authority (CA), and then inform the network entity of the verification result.

Meanwhile, the embodiment described with reference to FIG. 14 may be applied to all of the transmission and reception of the uplink and the downlink.

Hereinafter, the packet structure for more improving calculation efficiency to selectively provide security to data according to embodiment is provided. This is described in detail with reference to FIGS. 15A to 15E.

Figure 15A:
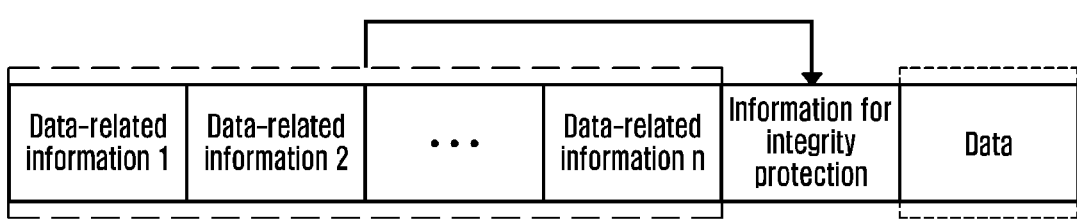
FIG. 15A illustrates an example of a packet structure according to various embodiments of the present disclosure.

FIG. 15A illustrates an example of a packet structure according to various embodiments of the present disclosure.

Referring to FIG. 15A, the structure of a packet including data when security is selectively provided for the data on the basis of whether the data is ciphered is illustrated. According to an embodiment, it is possible to perform integrity protection for providing integrity only for some or all of the information (for example, headers of the protocol layers (PDCP-H, SDAP-H, IP-H, TCP-H, or TLS-H) or additional information) related to the data except for already ciphered data within the packet. Accordingly, information (for example, the MAC-I) for integrity protection of some or all of the information related to the data may be generated, which may be added to be located right before the data. By placing the information (MAC-I) for integrity protection right before the data, there is no need to decode the packet to the end when the PDCP layer of the receiver performs integrity verification of the packet through the information (MAC-I) for integrity protection, and thus efficiency of calculations can be improved.

According to an embodiment, ciphering may be performed for some or all of the information related to the data (for example, the header of the protocol layer or additional information) except for the ciphered data within the packet and the information (MAC-I) for integrity protection. Alternatively, ciphering may be performed for some or all of the ciphered data within the packet, some or all of the information related to the data (for example, the header of the protocol layer or additional information), and the information (MAC-I) for integrity protection. According to the packet structure illustrated in FIG. 15A, as the information for integrity protection is added to be located between the information related to the data and data that is not ciphered, an effect of improving calculation efficiency of block ciphering can be obtained when ciphering is performed.

Meanwhile, FIG. 15A illustrates that integrity protection and ciphering are performed only for the information (for example, the header of the protocol layer or additional information) related to the data except for the ciphered data within the packet, but this is only an example for convenience of description and the disclosure is not limited thereto. For example, integrity protection and ciphering may be performed for some or all of the ciphered data within the packet or some or all of the information related to the data. In this case, some or all of the ciphered data or information for integrity protection for some or all of the data may be generated and added to be located right before the data.

Figure 15B:
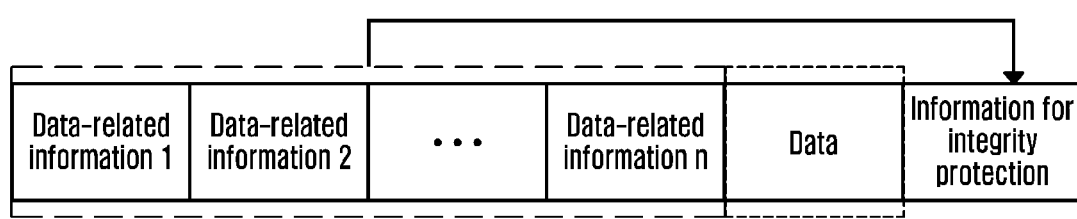
FIG. 15B illustrates another example of the packet structure according to various embodiments of the present disclosure.

FIG. 15B illustrates another example of the packet structure according to various embodiments of the present disclosure.

Referring to FIG. 15B, the structure of a packet including data when security is selectively provided for the data on the basis of whether the data is ciphered is illustrated. According to an embodiment, it is possible to perform integrity protection for providing integrity only for some or all of the information (for example, headers of the protocol layers (PDCP-H, SDAP-H, IP-H, TCP-H, or TLS-H) or additional information) related to the data except for already ciphered data within the packet. Accordingly, information (for example, the MAC-I) for integrity protection for some or all of the information related to the data may be generated and added to be located right after the data. According to the packet structure, when a protocol data unit (PDU) transmitted to the lower layer is generated on the basis of a service data unit (SDU) received from the higher layer, there is an advantage of reducing complexity of the operation as long as the information for integrity protection is located right after the data without any separate operation (for example, byte copy) generated during packet recombination. According to the packet structure illustrated in FIG. 15B, information related to data and information for integrity protection may be made as consecutive data and then ciphering may be performed therefor, or ciphering may be separately performed for the information related to the data and the information for integrity protection.

Meanwhile, FIG. 15B illustrates that integrity protection and ciphering are performed only for the information (for example, the header of the protocol layer or additional information) related to the data except for the ciphered data within the packet, but this is only an example for convenience of description and the disclosure is not limited thereto. For example, integrity protection and ciphering may be performed for some or all of the ciphered data within the packet or some or all of the information related to the data. In this case, some or all of the ciphered data or information for integrity protection for some or all of the data may be generated and added to be located right after the data.

Figure 15C:
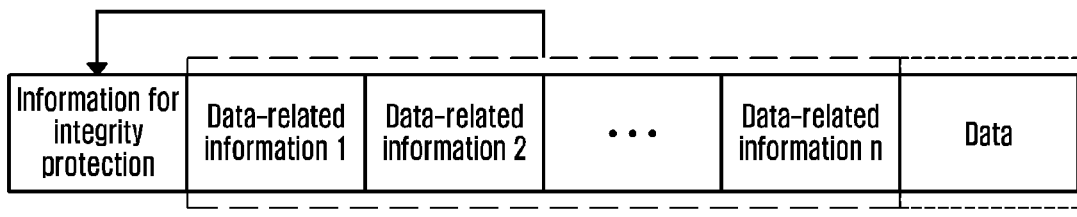
FIG. 15C illustrates another example of the packet structure according to various embodiments of the present disclosure.

FIG. 15C illustrates another example of the packet structure according to various embodiments of the present disclosure.

Referring to FIG. 15C, the structure of a packet including data when security is selectively provided for the data on the basis of whether the data is ciphered is illustrated. According to an embodiment, it is possible to perform integrity protection for providing integrity only for some or all of the information (for example, headers of the protocol layers (PDCP-H, SDAP-H, IP-H, TCP-H, or TLS-H) or additional information) related to the data except for already ciphered data within the packet. Accordingly, information (for example, the MAC-I) for integrity protection for some or all of the information related to the data may be generated and added to be located at the very front of the packet. According to the packet structure, since the information (MAC-I) for integrity protection and the information related to the data are located to be consecutively gathered, there is an advantage of efficiently processing packets at once.

Meanwhile, FIG. 15C illustrates that integrity protection and ciphering are performed only for the information (for example, the header of the protocol layer or additional information) related to the data except for the ciphered data within the packet, but this is only an example for convenience of description and the disclosure is not limited thereto. For example, integrity protection and ciphering may be performed for some or all of the ciphered data within the packet or some or all of the information related to the data. In this case, some or all of the ciphered data or information for integrity protection for some or all of the data may be generated and added to be located at the very front of the packet.

Figure 15D:
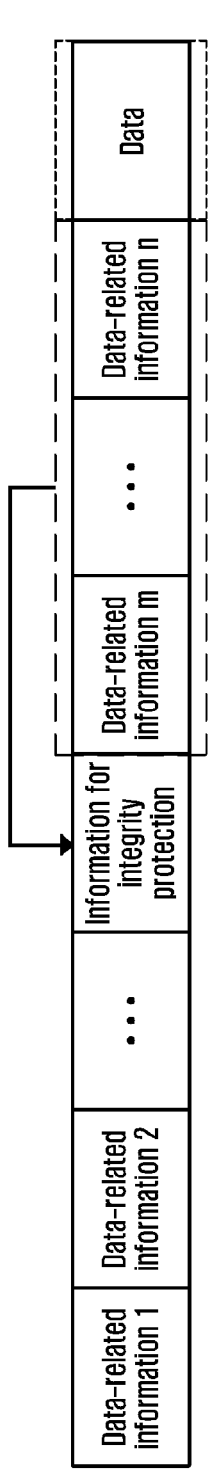
FIG. 15D illustrates another example of the packet structure according to various embodiments of the present disclosure.

FIG. 15D illustrates another example of the packet structure according to various embodiments of the present disclosure.

Referring to FIG. 15D, the structure of a packet including data when security is selectively provided for the data on the basis of whether the data is ciphered is illustrated. According to an embodiment, it is possible to perform integrity protection for providing integrity only for some or all of the information (for example, headers of the protocol layers (PDCP-H, SDAP-H, IP-H, TCP-H, or TLS-H) or additional information) related to the data except for already ciphered data within the packet. Accordingly, information (for example, the MAC-I) for integrity protection for some or all of the information related to the data may be generated and added to be located before information related to data considered for generation of the information for integrity protection. According to the packet structure, since the information (MAC-I) for integrity protection and the information related to the data are located to be consecutively gathered, packets can be more efficiently processed at once, and complexity of the operation can be reduced as long as the information for integrity protection is added to be located before the information related to the data considered for generation of the information for integrity protection without any separate operation (for example, byte copy) generated in packet recombination.

Meanwhile, FIG. 15D illustrates that integrity protection and ciphering are performed only for the information (for example, the header of the protocol layer or additional information) related to the data except for the ciphered data within the packet, but this is only an example for convenience of description and the disclosure is not limited thereto. For example, integrity protection and ciphering may be performed for some or all of the ciphered data within the packet or some or all of the information related to the data. In this case, some or all of the ciphered data or information for integrity protection for some or all of the data may be generated and added to be located before information related to data considered for generation of the information for integrity protection.

Figure 15E:
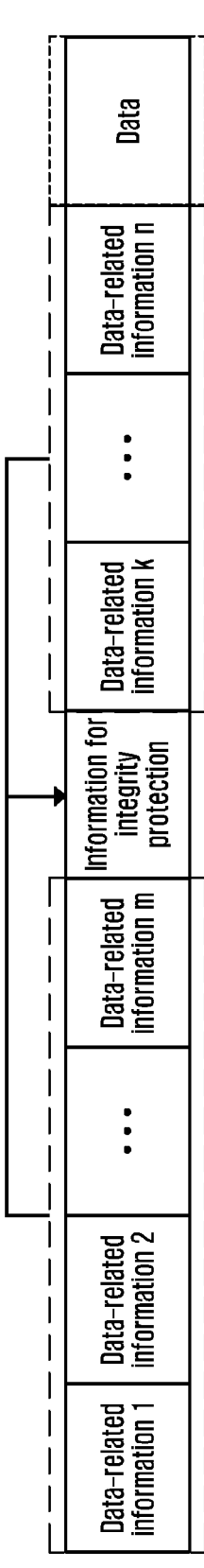
FIG. 15E illustrates another example of the packet structure according to various embodiments of the present disclosure.

FIG. 15E illustrates another example of the packet structure according to various embodiments of the present disclosure.

Referring to FIG. 15E, the structure of a packet including data when security is selectively provided for the data on the basis of whether the data is ciphered is illustrated. According to an embodiment, it is possible to perform integrity protection for providing integrity only for some or all of the information (for example, headers of the protocol layers (PDCP-H, SDAP-H, IP-H, TCP-H, or TLS-H) or additional information) related to the data except for already ciphered data within the packet. Accordingly, information (for example, the MAC-I) for integrity protection for some or all of the information related to the data may be generated and added to be located between pieces of information related to data considered for generation of the information for integrity protection. For example, information for integrity protection may be added to be located after the PDCP-H or the SDAP-H between pieces of information related to the data. According to the packet structure, consecutive ciphering can be performed and thus efficiency of calculations can be increased. According to another embodiment, information for integrity protection may be added to be located between the PDCP-H and the SDAP-H among pieces of information related to the data. According to the packet structure, there is an advantage of reducing complexity of the operation as long as the information for integrity protection is added to be located between the PDCH-H and the SDAP-H without any separate operation (for example, byte copy) generated in packet recombination.

Meanwhile, FIGS. 15A to 15E correspond to examples of the packet structure to which the disclosure can be applied, and the disclosure is not limited thereto. For example, the disclosure can be applied to packet structures that are not illustrated in FIGS. 15A to 15E. Further, it is illustrated that integrity protection and ciphering are performed by the PDCP layer, but the disclosure is not limited thereto. The name of the layer performing integrity protection and ciphering is not limited, and integrity protection and ciphering may be performed by at least one layer.

Figure 16:
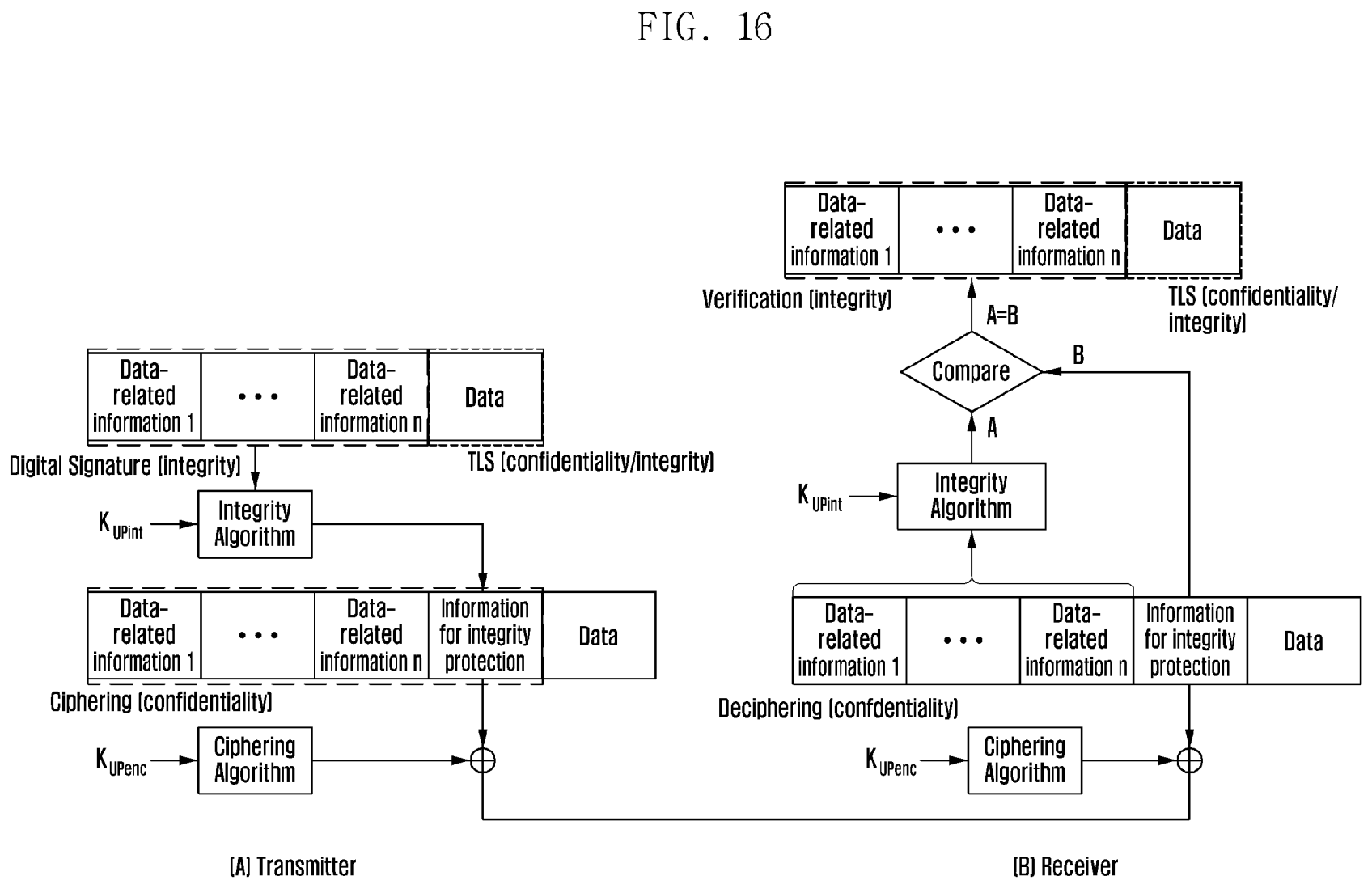

FIG. 16 illustrates operations of a transmitter and a receiver in a UP security procedure based on whether data is ciphered according to various embodiments of the present disclosure.

In FIG. 16, it is assumed that data is ciphered and a key used for integrity protection and ciphering is shared between the transmitter and the receiver. Meanwhile, the assumption is only for convenience of description and the disclosure is not limited thereto. Further, information related to data illustrated in FIG. 16 may include headers of corresponding protocol layers such as the PDCP, the SDAP, the IP, the TCP, and the TLS or include additional information while data is transmitted and received.

Referring to FIG. 16, the transmitter may generate information (illustrated as the MAC-I in FIG. 16) for integrity protection based on some or all of the information related to the data within the packet to be integrity-protected as an input value of an integrity protection algorithm according to the disclosure and add the information to a specific location of the packet. Meanwhile, integrity protection may be performed not only for some or all of the information related to the data within the packet but also for some or all of the ciphered data. According to an embodiment, data to be integrity-protected or information related to the data may be defined by a preconfiguration between the transmitter and the receiver.

For example, the transmitter and the receiver may share information indicating some or all of the data to be integrity-protected and some or all of the information related to the data through the preconfiguration. Meanwhile, the location of the information (MAC-I) for integrity protection in the packet structure illustrated in FIG. 16 is right before the data, but the disclosure is not limited thereto. According to an embodiment, the location (for example, corresponding to the location described with reference to FIGS. 15A to 15E or corresponding to a location different from that described reference to FIGS. 15A to 15E) of the information (MAC-I) for integrity protection may be defined by the preconfiguration between the transmitter and the receiver.

After performing the integrity protection procedure, the transmitter may perform ciphering based on some or all of the information related to the data and the information (MAC-I) for integrity protection based on as an input value of a ciphering algorithm, replace the same with the conventional packet, and transmit the same to the receiver. Meanwhile, ciphering may be performed not only for some or all of the information related to the data within the packet but also for some or all of the ciphered data. According to an embodiment, data to provide confidentiality through ciphering or information related to the data may be defined by the preconfiguration between the transmitter and the receiver. For example, the transmitter and the receiver may share information indicating some or all of the data to be ciphered or some or all of the information related to the data through the preconfiguration. The receiver perform deciphering based on the received packet as an input value of a deciphering algorithm. Thereafter, integrity verification is performed by calculating information (for example, the X-MAC) for integrity verification based on some or all of the information related to the data within the packet as an input value of an integrity verification algorithm and comparing the information with the MAC-I within the packet. When they are the same as each other on the basis of the comparison result, it may be determined that the integrity verification is successfully performed. Alternatively, when they are different from each other, it may be determined that the integrity verification fails and the received packet may be discarded.

FIG. 16 illustrates that operations of the transmitter and the receiver in the UP security procedure according to the packet structure described with reference to FIG. 15A. Meanwhile, the disclosure is not limited thereto, and the operation described with reference to FIG. 16 may be performed according to the packet structure described with reference to FIG. 15B or FIG. 15E or the operation described with reference to FIG. 16 may be performed according to a packet structure different from that described with reference to FIG. 15A to FIG. 15E.

Meanwhile, in the case of the uplink, the transmitter may refer to the UE (or the PDCP layer of the UE or the layer performing integrity protection and ciphering among the protocol layers of the UE), and the receiver may refer to the network entity (or the BS, the PDCP layer of the BS, or the layer performing integrity protection and ciphering among the protocol layers of the BS). Alternatively, in the case of the downlink, the transmitter may refer to the network entity (or the BS, the PDCP layer of the BS, or the layer performing integrity protection and ciphering among the protocol layers of the BS), and the receiver may refer to the UE (or the PDCP layer of the UE or the layer performing integrity protection and ciphering among the protocol layers of the UE).

Figure 17:
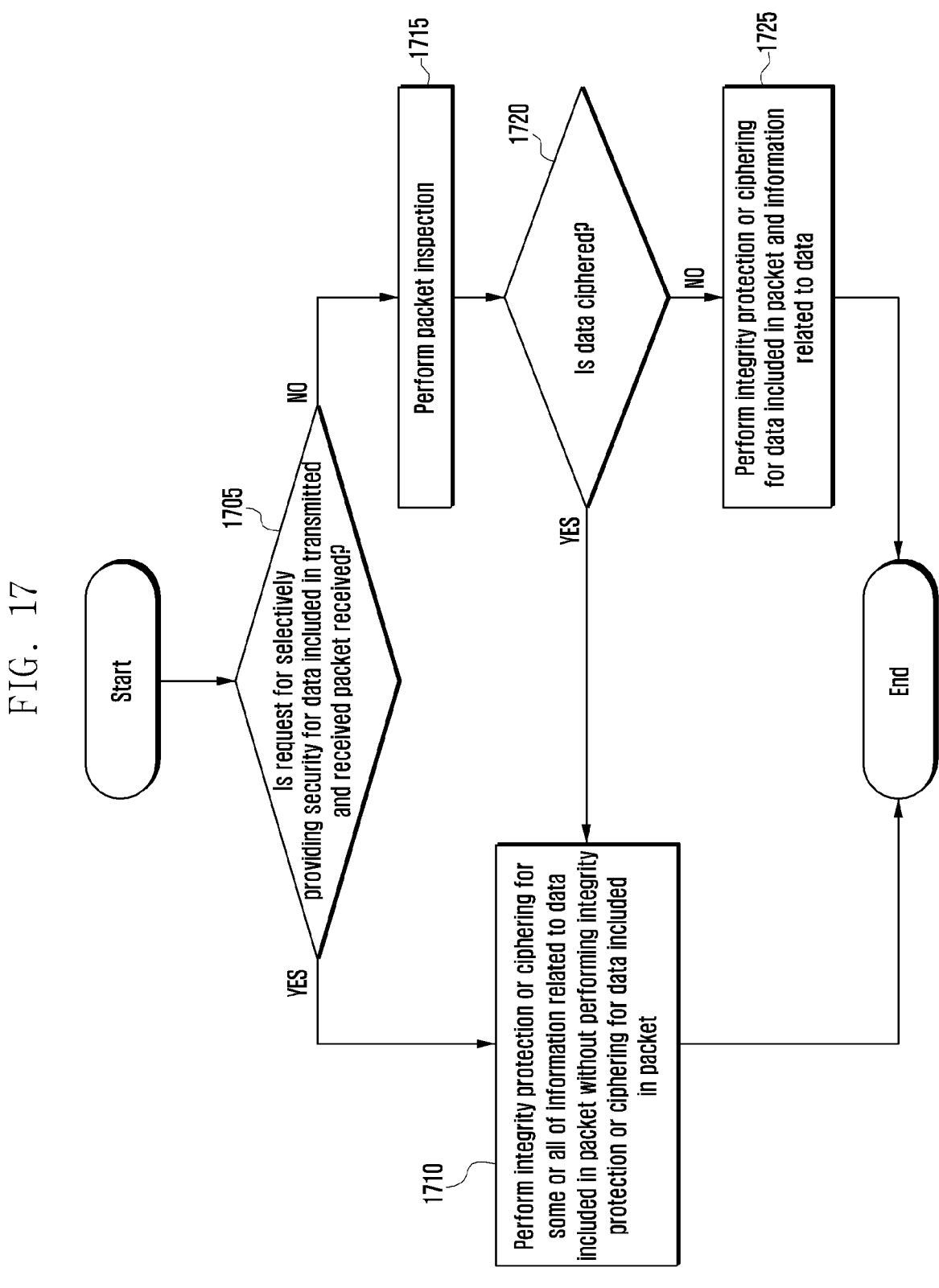
FIG. 17 illustrates an operation of a network entity according to various embodiments of the present disclosure.

FIG. 17 illustrates an operation of a network entity according to various embodiments of the present disclosure.

Referring to FIG. 17, in operation 1705, the network entity may identify whether a request for selectively providing security for data within a transmitted and received packet is received. For example, as illustrated in FIG. 13, the network entity may not provide security for the data within the packet and may identify whether a request for performing ciphering or integrity protection only for some or all of the information related to the data (for example, additional information or a header of the protocol layer) from the UE. Alternatively, as illustrated in FIG. 14, the network entity may not provide security for the data within the packet and may identify whether a request for performing ciphering or integrity protection only for some or all of the information related to the data (for example, additional information or a header of the protocol layer) from a server outside the communication system.

When the request is received, the network entity may not perform ciphering or integrity protection for the data within the transmitted and received packet but may perform ciphering or integrity protection only for some or all of the information related to the data within the packet (for example, the header of the protocol layer or additional information) in operation 1710.

Alternatively, when the request is not received, the network entity may inspect the transmitted and received packet in operation 1715. The network entity may determine whether the data within the corresponding packet is ciphered on the basis of the result of inspection of the packet in operation 1720. For example, the network entity may identify whether the corresponding packet is ciphered through the inspection of the packet on the basis of a specific ciphering protocol and, accordingly, determine whether the data within the corresponding packet is ciphered. Meanwhile, according to an embodiment, the network may inspect a packet of corresponding IP flow for each IP flow associated with at least one of a specific QoS requirement, QoS flow (QFI), GBR, or non-GBR. At this time, the number of packets inspected to determine whether the data within the packet of the IP flow is ciphered may be determined in advance as a specific number. Alternatively, all packets of the corresponding IP flow may be inspected.

Alternatively, the number of packets inspected for the corresponding IP flow may be determined on the basis of at least one of a specific QoS requirement, QoS flow (QFI), GBR, or non-GBR associated with the corresponding IP flow. According to another embodiment, the network entity may perform inspection of packets transmitted and received for each DRB in which case the number of packets inspected to determine whether data within the packet transmitted and received in the corresponding DRB is ciphered may be determined in advance as a specific number. Alternatively, all packets transmitted and received in the corresponding DRB may be inspected, and the number of packets inspected for the corresponding DRB may be determined on the basis of at least one of a QoS requirement, QoS flow, GBR, or non-GBR associated with the corresponding DRB. According to another embodiment, the network entity may perform inspection of packets transmitted and received for each PDU session in which case the number of packets inspected to determine whether data within the packet transmitted and received in the corresponding PDU session is ciphered may be determined in advance as a specific number or all packets transmitted and received in the corresponding PDU session may be inspected.

When it is identified that the data within the packet is ciphered through inspection of the packet as described above, the network entity may not perform ciphering or integrity protection for the data within the transmitted and received packet but may perform ciphering or integrity protection only for some or all of the information related to the data within the packet (for example, the header of the protocol layer or additional information) in operation 1710. Further, as illustrated in FIG. 12, the network entity may make a request for or indicate performing ciphering or integrity protection only for some or all of the information related to the data within the transmitted and received packet.

Alternatively, when it is identified that the data within the packet is not ciphered through inspection of the packet, the network entity may perform ciphering or integrity protection for data within the transmitted and received packet and information related to the data in operation 1725.

Meanwhile, operations 1705 to 1725 illustrated in FIG. 17 may be changed orders, some thereof may be omitted, or may be performed at the same time. Further, FIG. 17 illustrates that ciphering or integrity protection is not performed for ciphered data within the packet, but the disclosure is not limited thereto and ciphering or integrity protection may be performed not only for some or all of the information related to the data within the packet but also for some or all of the ciphered data.

Figure 18:
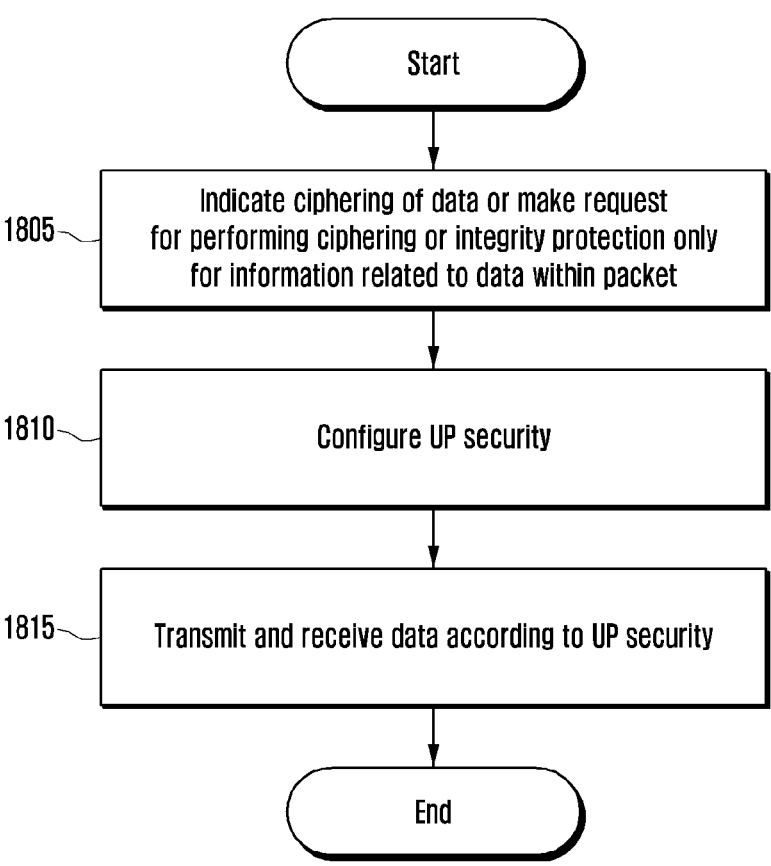
FIG. 18 illustrates the operation of the UE according to various embodiments of the present disclosure.

FIG. 18 illustrates the operation of the UE according to various embodiments of the present disclosure.

Referring to FIG. 18, in operation 1805, the UE may indicate whether to cipher data within a packet to a network entity or make a request for performing ciphering or integrity protection only on information related to data within a packet (for example, a header of a protocol layer or additional information).

In operation 1810, the UE may receive a configuration of UP security by receiving an indication of ciphering or integrity protection only for information related to data within the packet from the network entity.

Thereafter, in operation 1815, the UE may transmit and receive data to and from the network entity according to the configured UP security.

Meanwhile, operations 1805 to 1815 illustrated in FIG. 18 may be changed orders, some thereof may be omitted, or may be performed at the same time.

Figure 19:
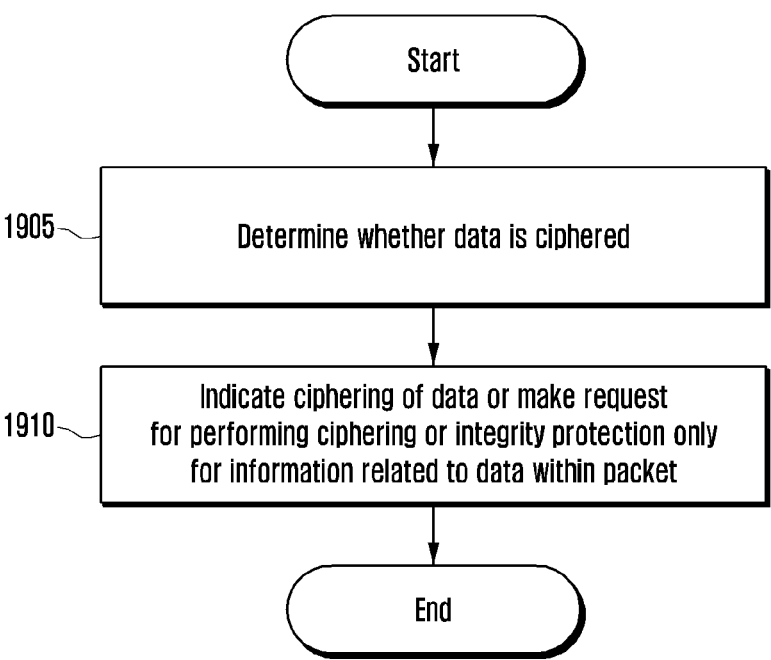
FIG. 19 illustrates an operation of the server according to various embodiments of the present disclosure.

FIG. 19 illustrates an operation of the server according to various embodiments of the present disclosure.

Referring to FIG. 19, in operation 1905, the server may determine whether data is ciphered.

When the data is ciphered, the server may indicate whether to cipher data within a packet to a network entity or make a request for performing ciphering or integrity protection only on information related to data within a packet (for example, a header of a protocol layer or additional information) in operation 1910.

Meanwhile, operations 1905 to 1910 illustrated in FIG. 19 may be changed orders, some thereof may be omitted, or may be performed at the same time.

Figure 20:
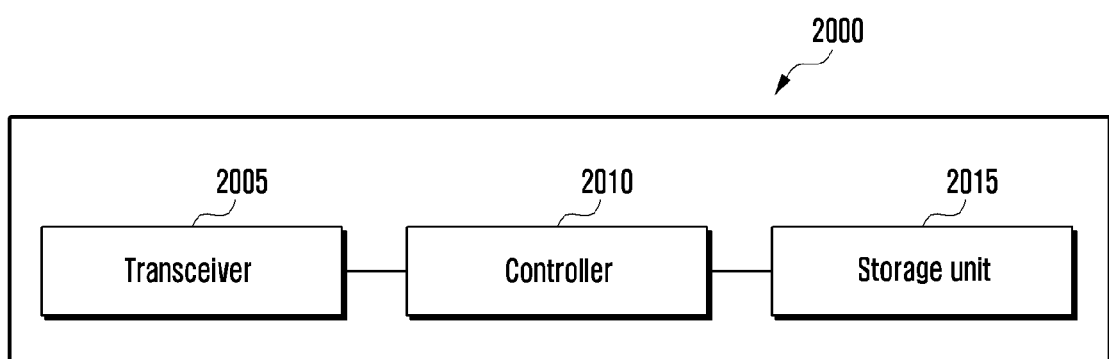
FIG. 20 illustrates a structure of a network entity according to various embodiments of the present disclosure.

FIG. 20 illustrates the structure of a network entity according to various embodiments of the present disclosure.

Referring to FIG. 20, a network entity 2000 according to an embodiment may include a transceiver 2005, a controller 2010, and a storage unit 2015. In the disclosure, the controller 2010 of the network entity 2000 may be defined as a circuit, an application-specific integrated circuit, or at least one processor.

The transceiver 2005 may transmit and receive a signal. The transceiver 2005 may transmit, for example, a signal to the UE or the server according to an embodiment and receive a signal from the UE or the server.

The controller 2010 may control the overall operation of the network entity 2000 according to an embodiment provided in the disclosure. For example, the controller 2010 may control signal flow between respective blocks to perform the operation according to the above-described drawings (or flowcharts).

The storage unit 2015 may store at least one piece of information transmitted and received through the transceiver 2005 and information generated through the controller 2010.

Figure 21:
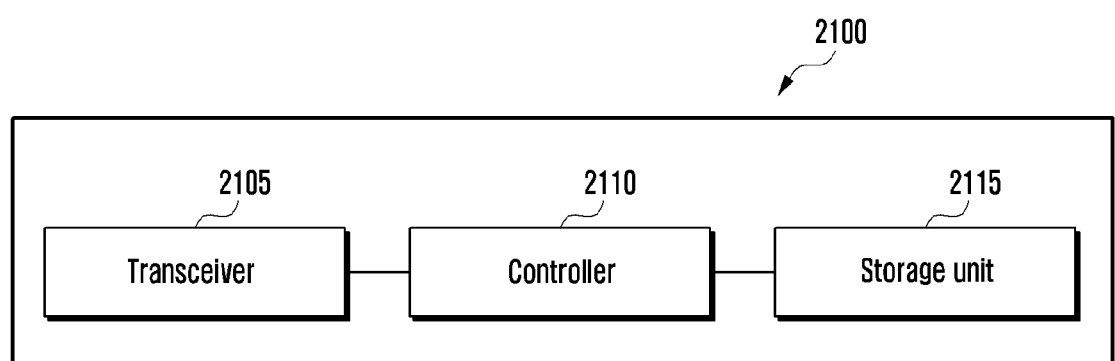
FIG. 21 illustrates a structure of the UE according to various embodiments of the present disclosure.

FIG. 21 illustrates the structure of the UE according to various embodiments of the present disclosure.

Referring to FIG. 21, a UE 2100 according to an embodiment may include a transceiver 2105, a controller 2110, and a storage unit 2115. In the disclosure, the controller 2110 of the UE 2100 may be defined as a circuit, an application-specific integrated circuit, or at least one processor.

The transceiver 2105 may transmit and receive a signal. The transceiver 2105 may transmit, for example, a signal to a network entity according to an embodiment and receive a signal from the network entity.

The controller 2110 may control the overall operation of the UE 2100 according to an embodiment provided in the disclosure. For example, the controller 2110 may control signal flow between respective blocks to perform the operation according to the above-described drawings (or flowcharts).

The storage unit 2115 may store at least one piece of information transmitted and received through the transceiver 2105 and information generated through the controller 2010.

Figure 22:
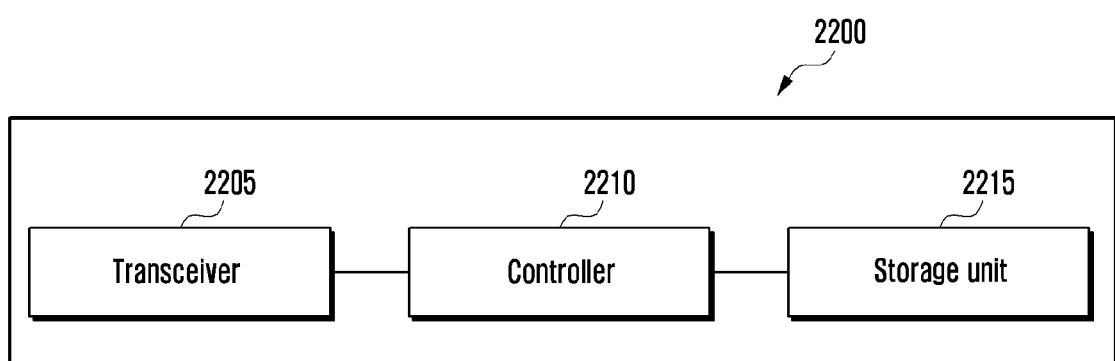
FIG. 22 illustrates a structure of the server according to various embodiments of the present disclosure.

FIG. 22 illustrates the structure of the server according to various embodiments of the present disclosure.

Referring to FIG. 22, the server 2200 according to an embodiment may include a transceiver 2205, a controller 2210, and a storage unit 2215. In the disclosure, the controller 2210 of the server 2200 may be defined as a circuit, an application-specific integrated circuit, or at least one processor.

The transceiver 2205 may transmit and receive a signal. The transceiver 2205 may transmit, for example, a signal to a network entity according to an embodiment and receive a signal from the network entity.

The controller 2210 may control the overall operation of the server 2200 according to an embodiment provided in the disclosure. For example, the controller 2210 may control signal flow between respective blocks to perform the operation according to the above-described drawings (or flowcharts).

The storage unit 2215 may store at least one piece of information transmitted and received through the transceiver 2205 and information generated through the controller 2210.

The various embodiments for solving the problem of communication delay according to calculation resource consumption and the calculation time increase due to overlapping ciphering of data in the communication system have been described above.

According to an embodiment, a method of identifying whether data is ciphered, and an apparatus and a system for performing the same are provided. According to an embodiment, a method of selectively providing security of data (for example, ciphering or integrity protection) on the basis of whether the data is ciphered, and an apparatus and a system for performing the same are provided. According to an embodiment, a method of indicating selective provision of security (for example, ciphering or integrity protection) for data on the basis of whether the data is ciphered, and an apparatus and a system for performing the same are provided. According to an embodiment, in provision of security of data, the structure of a packet for improving calculation efficiency is provided. Accordingly, when data has been already ciphered, it is possible to obtain an effect of preventing overlapping ciphering and minimizing calculation resources consumed by a ciphering procedure or an integrity protection procedure and minimizing a calculation delay time through a decrease in the calculation time, thereby implementing a more efficient communication system.

In the methods provided in the disclosure, some or all of the contents included in the respective embodiments may be implemented in combination without departing from the essential spirit and scope of the disclosure.

The embodiments described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented.

Further, although exemplary embodiments have been described and shown in the specification and the drawings by using particular terms, they have been used in a general sense merely to easily explain the technical contents of the disclosure and help understanding of the disclosure, and are not intended to limit the scope of the disclosure. It will be apparent to those skilled in the art that, in addition to the embodiments disclosed herein, other variants based on the technical idea of the disclosure may be implemented.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a base station in a communication system, the method comprising:
  receiving, from a server or a user equipment (UE), a request to configure user plane (UP) security for at least one header of a packet except for ciphered payload, wherein the packet includes payload and the at least one header, the payload corresponding to data, and the at least one header being associated with the data;
  determining whether the payload is ciphered at an upper layer and the at least one header is not ciphered at the upper layer, based on the request;
  in case that the payload is ciphered and the at least one header is not ciphered, transmitting, to the, a control message including an indicator instructing the UE to configure the UP security for the at least one header, except for the payload;
  configuring the UP security for the at least one header, except for the payload; and
  transmitting, to the UE, a downlink signal secured based on the UP security, and receiving, from the UE, an uplink signal secured based on the UP security,
  wherein configuring the UP security for the at least one header includes ciphering the at least one header.

2. The method of claim 1, further comprising:
  performing an inspection of the packet based on at least one ciphering protocol,
  wherein the payload is determined to be ciphered based on the inspection.

3. The method of claim 1,
  wherein the payload is determined to be ciphered based on a reception of the request.

4. The method of claim 1,
  wherein configuring the UP security for the at least one header further includes:
  performing integrity protection procedure for the at least one header; and
  generating information for integrity protection, based on the integrity protection procedure,
  wherein the information for the integrity protection is ciphered with the at least one header,
  wherein the information for the integrity protection includes a message authentication code-integrity (MAC-I),
  wherein a location of the information for the integrity protection corresponding to the payload is determined based on a location of the payload, and
  wherein the information for the integrity protection is located in front of the payload in the packet.

5. A method of a user equipment (UE) in a communication system, the method comprising:
  transmitting, to a base station, a request to configure user plane (UP) security for at least one header of a packet except for ciphered payload, wherein the packet includes payload and the at least one header, the payload corresponding to data, and the at least one header being associated with the data;
  as a response to the request, in case that the payload is ciphered at an upper layer and the at least one header is not ciphered at the upper layer, receiving, from the base station, a control message including an indicator instructing the UE to configure the UP security for the at least one header, except for the payload;
  configuring the UP security for the at least one header, except for the payload; and
  receiving, from the base station, a downlink signal secured based on the UP security, and transmitting, to the base station, an uplink signal secured based on the UP security,
  wherein configuring the UP security for the at least one header includes ciphering the at least one header.

6. The method of claim 5,
  wherein configuring the UP security for the at least one header further includes:
  performing integrity protection procedure for the at least one header; and
  generating information for integrity protection based on the integrity protection procedure,
  wherein the information for the integrity protection is ciphered with the at least one header,
  wherein the information for the integrity protection includes a message authentication code-integrity (MAC-I),
  wherein a location of the information for the integrity protection corresponding to the payload is determined based on a location of the payload, and
  wherein the information for the integrity protection is located in front of the payload in the packet.

7. A method of a server in a communication system, the method comprising:
  generating a request to configure user plane (UP) security for at least one header of a packet except for ciphered payload, wherein the packet includes payload and the at least one header, the payload corresponding to data, and the at least one header being associated with the data; and transmitting, to a base station, the request;

wherein, in case that the payload is ciphered at an upper layer and the at least one header is not ciphered at the upper layer, a downlink signal and an uplink signal are secured based on the UP security for the at least one header except for the payload, and wherein the UP security for the at least one header includes ciphering for the at least one header.

8. A base station in a communication system, the base station comprising:

a transceiver; and a controller operably connected to the transceiver, the controller configured to:

receive, from a server or a user equipment (UE), a request to configure user plane (UP) security for at least one header of a packet except for ciphered payload, wherein the packet includes payload and the at least one header, the payload corresponding to data, and the at least one header being associated with the data, determine whether the payload is ciphered at an upper layer and the at least one header is not ciphered at the upper layer, based on the request, in case that the payload is ciphered and the at least one header is not ciphered, transmit, to the UE, a control message including an indicator instructing the UE to configure the UP security for the at least one header, except for the payload, configure the UP security for the at least one header, except for the payload, and transmit, to the UE, a downlink signal secured based on the UP security, and receive, from the UE, an uplink signal secured based on the UP security, wherein a configuration of the UP security for the at least one header includes ciphering the at least one header.

9. The base station of claim 8, wherein the controller is further configured to perform an inspection of the packet based on at least one ciphering protocol, and wherein the payload is determined to be ciphered based on the inspection.

10. The base station of claim 8, wherein the payload is determined to be ciphered based on a reception of the request.

11. The base station of claim 8, wherein the configuration of the UP security for the at least one header further includes:

performing integrity protection procedure for the at least one header; and generating information for integrity protection, based on the integrity protection procedure, wherein the information for the integrity protection is ciphered with the at least one header, wherein the information for the integrity protection includes a message authentication code-integrity (MAC-I), wherein a location of the information for the integrity protection corresponding to the payload is determined based on a location of the payload, and wherein the information for the integrity protection is located in front of the payload in the packet.

12. A user equipment (UE) in a communication system, the UE comprising:

a transceiver; and a controller operably connected to the transceiver, the controller configured to:

transmit, to a base station, a request to configure user plane (UP) security for at least one header of a packet except for ciphered payload, wherein the packet includes payload and the at least one header, the payload corresponding to data, and the at least one header being associated with the data;

as a response to the request, in case that the payload is ciphered at an upper layer and the at least one header is not ciphered at the upper layer, receive, from the base station, a control message including an indicator instructing the UE to configure the UP security for the at least one header, except for the payload, configure the UP security for the at least one header, except for the payload, and receive, from the base station, a downlink signal secured based on the UP security, and transmit, to the base station, an uplink signal secured based on the UP security, wherein a configuration of the UP security for the at least one header includes ciphering the at least one header.

13. The UE of claim 12, wherein the configuration of the UP security for the at least one header further includes:

performing integrity protection procedure for the at least one header; and generating information for integrity protection based on the integrity protection procedure, wherein the information for the integrity protection is ciphered with the at least one header, wherein the information for the integrity protection includes a message authentication code-integrity (MAC-I), wherein a location of the information for the integrity protection corresponding to the payload is determined based on a location of the payload, and wherein the information for the integrity protection is located in front of the payload in the packet.

14. A server in a communication system, the server comprising:

a transceiver; and a controller operably connected to the transceiver, the controller configured to:

generate a request to configure user plane (UP) security for at least one header of a packet except for ciphered payload, wherein the packet includes payload and the at least one header, the payload corresponding to data, and the at least one header being associated with the data, and transmit, to a base station, the request, wherein, in case that the payload is ciphered at an upper layer and the at least one header is not ciphered at the upper layer, a downlink signal and an uplink signal are secured based on the UP security for the at least one header except for the payload, and wherein the UP security for the at least one header includes ciphering for the at least one header.

* * * * *